(12) United States Patent
Pinkerton et al.

(10) Patent No.: US 9,826,313 B2
(45) Date of Patent: Nov. 21, 2017

(54) COMPACT ELECTROACOUSTIC TRANSDUCER AND LOUDSPEAKER SYSTEM AND METHOD OF USE THEREOF

(71) Applicant: Clean Energy Labs, LLC, Austin, TX (US)

(72) Inventors: Joseph F. Pinkerton, Austin, TX (US); William Neil Everett, Cedar Park, TX (US); William Martin Lackowski, Austin, TX (US); David A. Badger, Lago Vista, TX (US)

(73) Assignee: Clean Energy Labs, LLC, Austin, TX (US)

( * ) Notice: Subject to any disclaimer, the term of this patent is extended or adjusted under 35 U.S.C. 154(b) by 37 days.

(21) Appl. No.: 14/717,715

(22) Filed: May 20, 2015

(65) Prior Publication Data
US 2016/0345083 A1 Nov. 24, 2016

(51) Int. Cl.
| | |
|---|---|
| *H04R 9/02* | (2006.01) |
| *H04R 19/00* | (2006.01) |
| *H04R 19/01* | (2006.01) |
| *H04R 19/02* | (2006.01) |
| *H04R 1/26* | (2006.01) |
| *H04R 1/28* | (2006.01) |
| *H04R 1/34* | (2006.01) |
| *H04R 1/40* | (2006.01) |
| *H04R 7/02* | (2006.01) |
| *H04R 1/02* | (2006.01) |
| *H04R 3/06* | (2006.01) |
| *H04R 7/04* | (2006.01) |
| *H04R 31/00* | (2006.01) |
| *H02M 7/487* | (2007.01) |

(52) U.S. Cl.
CPC ............... *H04R 9/022* (2013.01); *H04R 1/02* (2013.01); *H04R 1/26* (2013.01); *H04R 1/2896* (2013.01); *H04R 1/345* (2013.01); *H04R 1/403* (2013.01); *H04R 7/02* (2013.01); *H04R 19/02* (2013.01); *H02M 7/487* (2013.01); *H04R 3/06* (2013.01); *H04R 7/04* (2013.01); *H04R 19/00* (2013.01); *H04R 19/005* (2013.01); *H04R 19/01* (2013.01); *H04R 19/013* (2013.01); *H04R 31/003* (2013.01); *H04R 2201/003* (2013.01); *H04R 2307/023* (2013.01); *H04R 2307/025* (2013.01)

(58) Field of Classification Search
CPC  H04R 19/00; H04R 19/005; H04R 2201/003; H04R 19/01; H04R 19/02; H04R 19/013; H04R 1/26
See application file for complete search history.

(56) References Cited

U.S. PATENT DOCUMENTS

| | | | | |
|---|---|---|---|---|
| 4,246,448 A | * | 1/1981 | Tam .................... | H04R 19/013 307/400 |
| 8,139,794 B2 | * | 3/2012 | Chen .................... | H04R 31/006 381/150 |

(Continued)

*Primary Examiner* — Matthew Eason
(74) *Attorney, Agent, or Firm* — Dickinson Wright PLLC; Ross Spencer Garsson

(57) ABSTRACT

An improved compact electroacoustic transducer and loudspeaker system. The electroacoustic transducer (or array of electroacoustic transducers) can generate the desired sound by the use of pressurized airflow. The electroacoustic transducer uses a shared stator with an array of vent support fingers and metal frame instead of two stators per electroacoustic transducer.

35 Claims, 27 Drawing Sheets

(56) References Cited

U.S. PATENT DOCUMENTS

| | | | | |
|---|---|---|---|---|
| 9,100,754 B1* | 8/2015 | Pinkerton | | H04R 19/02 |
| 2007/0242844 A1* | 10/2007 | Harman | | H04R 19/02 |
| | | | | 381/191 |
| 2010/0260370 A1* | 10/2010 | Chen | | H04R 1/22 |
| | | | | 381/386 |
| 2011/0033079 A1* | 2/2011 | Liou | | H04R 19/00 |
| | | | | 381/431 |
| 2011/0075865 A1* | 3/2011 | Yang | | H04R 19/005 |
| | | | | 381/174 |
| 2011/0216921 A1* | 9/2011 | Tseng | | H04R 25/00 |
| | | | | 381/164 |
| 2011/0255721 A1* | 10/2011 | Chen | | H04R 19/01 |
| | | | | 381/191 |
| 2012/0014543 A1* | 1/2012 | Chiang | | H04R 19/013 |
| | | | | 381/191 |
| 2012/0237069 A1* | 9/2012 | Harman | | H04R 19/02 |
| | | | | 381/336 |
| 2014/0233779 A1* | 8/2014 | Harman | | H04R 19/02 |
| | | | | 381/339 |
| 2014/0239352 A1* | 8/2014 | Wang | | H04R 19/04 |
| | | | | 257/254 |

* cited by examiner

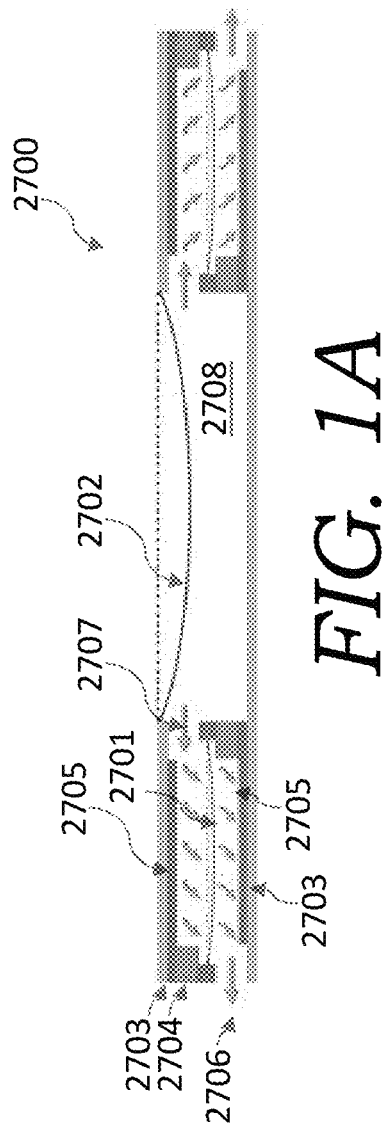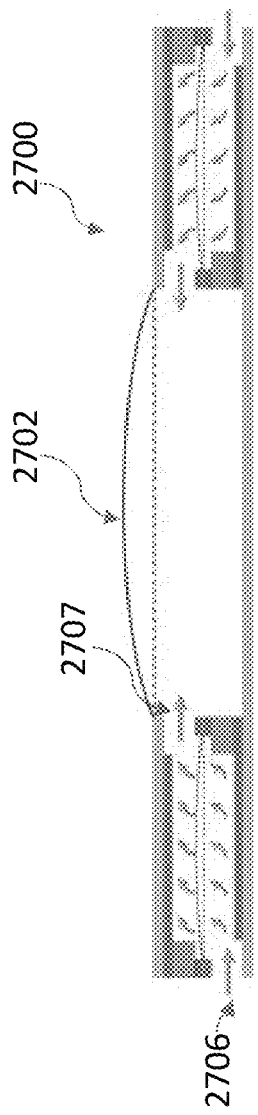
FIG. 1A
FIG. 1B

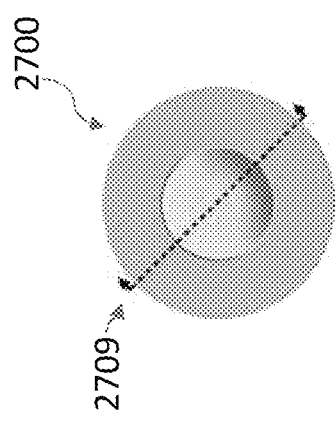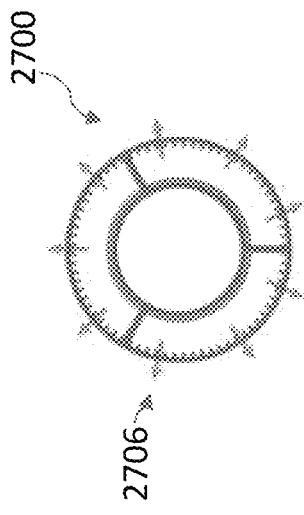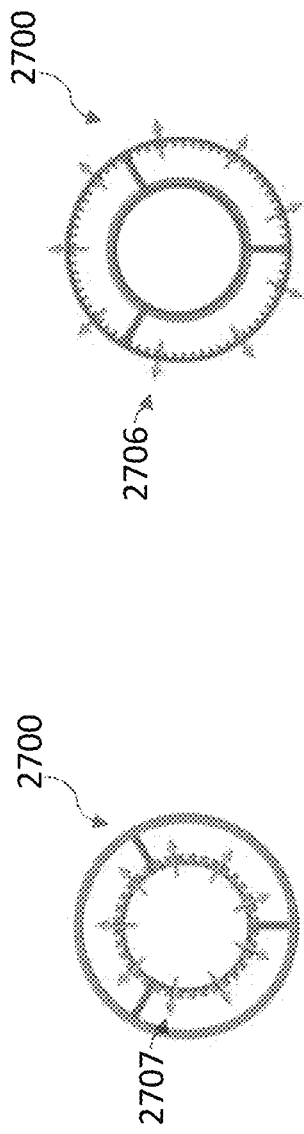

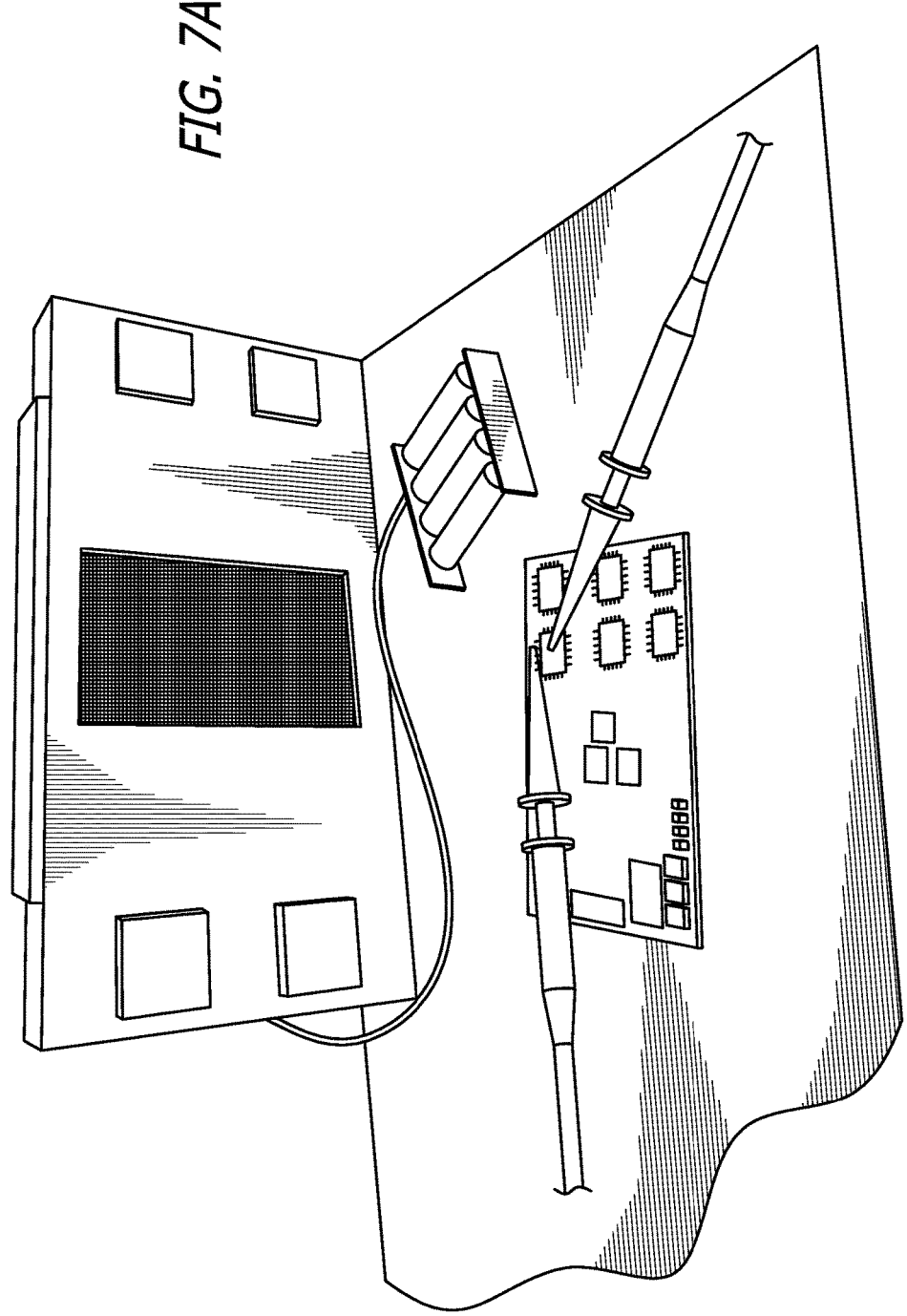

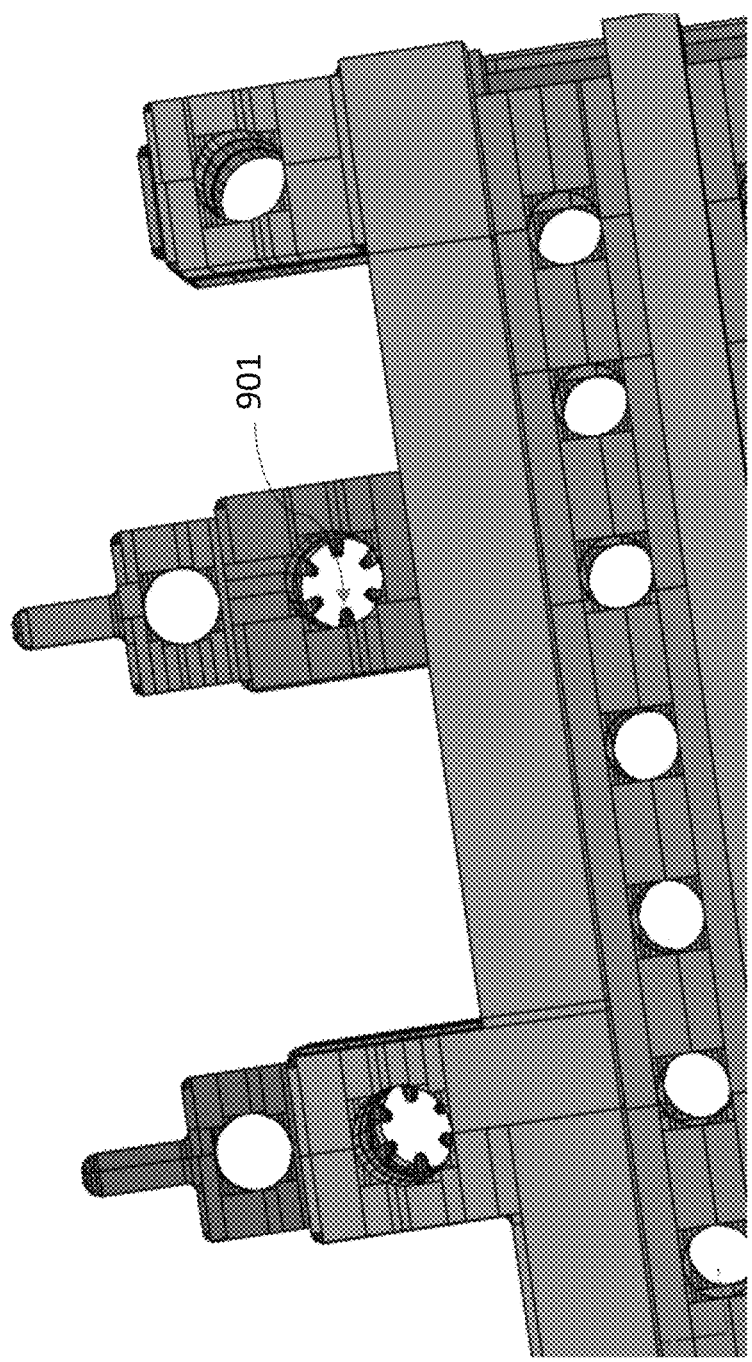

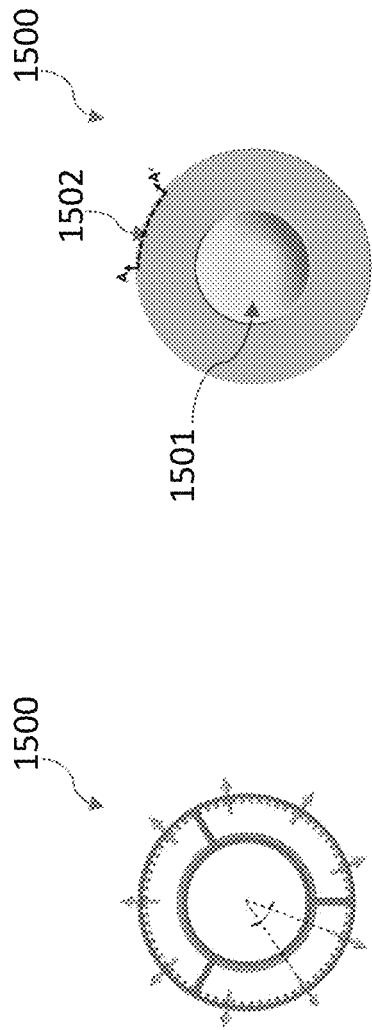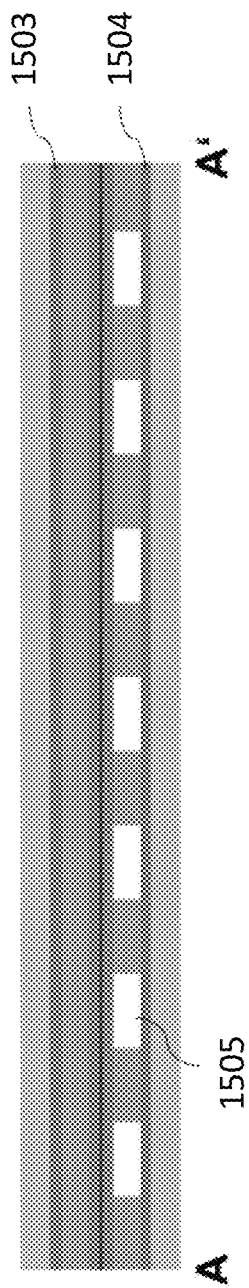
FIG. 15A
FIG. 15B
FIG. 15C

COMPACT ELECTROACOUSTIC TRANSDUCER AND LOUDSPEAKER SYSTEM AND METHOD OF USE THEREOF

RELATED PATENT APPLICATIONS

This application is related to U.S. patent application Ser. No. 14/309,615, filed on Jun. 19, 2014 (the "Pinkerton '615 application"), which is a continuation-in-part to U.S. patent application Ser. No. 14/161,550, filed on Jan. 22, 2014. This application is also related to U.S. patent application Ser. No. 14/047,813, filed Oct. 7, 2013, which is a continuation-in-part of International Patent Application No. PCT/2012/058247, filed Oct. 1, 2012, which designated the United States and claimed priority to provisional U.S. Patent Application Ser. No. 61/541,779, filed on Sep. 30, 2011. Each of these patent applications is entitled "Electrically Conductive Membrane Pump/Transducer And Methods To Make And Use Same."

This application is also related to U.S. Patent Application Ser. No. 62/113,235, entitled "Loudspeaker Having Electrically Conductive Membrane Transducers," filed Feb. 6, 2015 (the "Pinkerton '235 application").

All of these above-identified patent applications are commonly assigned to the Assignee of the present invention and are hereby incorporated herein by reference in their entirety for all purposes.

TECHNICAL FIELD

The present invention relates to loudspeakers, and in particular, to loudspeakers having an electrostatic transducer or an array of electrostatic transducers. The electrically conductive transducers generate the desired sound by the use of pressurized airflow.

BACKGROUND

Conventional audio speakers compress/heat and rarify/cool air (thus creating sound waves) using mechanical motion of a cone-shaped membrane at the same frequency as the audio frequency. Most cone speakers convert less than 10% of their electrical input energy into audio energy. These speakers are also bulky in part because large enclosures are used to muffle the sound radiating from the backside of the cone (which is out of phase with the front-facing audio waves). Cone speakers also depend on mechanical resonance; a large "woofer" speaker does not efficiently produce high frequency sounds, and a small "tweeter" speaker does not efficiently produce low frequency sounds.

Thermoacoustic (TA) speakers use heating elements to periodically heat air to produce sound waves. TA speakers do not need large enclosures or depend on mechanical resonance like cone speakers. However, TA speakers are terribly inefficient, converting well under 1% of their electrical input into audio waves.

The present invention relates to an improved loudspeaker that includes an array of electrically conductive membrane transducers such as, for example, an array of polyester-metal membrane pumps.

Graphene membranes (also otherwise referred to as "graphene drums") have been manufactured using a process such as disclosed in Lee et al. Science, 2008, 321, 385-388. PCT Patent Appl. No. PCT/US09/59266 (Pinkerton) (the "PCT US09/59266 application") described tunneling current switch assemblies having graphene drums (with graphene drums generally having a diameter between about 500 nm and about 1500 nm). PCT Patent Appl. No. PCT/US11/55167 (Pinkerton et al.) and PCT Patent Appl. No. PCT/US11/66497 (Everett et al.) further describe switch assemblies having graphene drums. PCT Patent Appl. No. PCT/US11/23618 (Pinkerton) (the "PCT US11/23618 application") described a graphene-drum pump and engine system.

FIGS. 1-5 are figures that have been reproduced from FIGS. 27-32 of the Pinkerton '615 application. As set forth in the Pinkerton '615 application:

FIGS. 1A-1E depict an electrically conductive membrane pump/transducer 2700 that utilizes an array of electrically conductive membrane pumps that cause a membrane 2702 to move in phase. FIGS. 1A-1B are cross-sectional views of the pump/transducer that includes electrically conductive members 2701 (in the electrically conductive membrane pumps) and a speaker membrane 2702. Speaker membrane 2702 can be made of a polymer, such as PDMS. Each of the electrically conductive membrane pumps has a membrane 2701 that can deflect toward downward and upwards. Traces 2605 are a metal (like copper, tungsten, or gold). The electrically conductive membrane pumps also have a structural material 2703 (which can be plastic, FR4 (circuit board material), or Kapton® polyimide film (DuPont USA)) and support material 2704 that is an electrical insulator (like oxide, FR4, or Kapton® polyimide film). Support material 2704 can be used to support the pump membrane, support the stator and also serve as the vent structure. Integrating these functions into one element makes device 2700 more compact than it would be with multiple elements performing these functions. All of the non-membrane elements shown in FIG. 1A-1E can be made from printed circuit boards or die stamped sheets, which enhances manufacturability.

Arrows 2706 and 2707 show the direction of fluid flow (i.e., air flow) in the pump/transducer 2700. When the electrically conductive membranes 2701 are deflected downward (as shown in FIG. 1A), air will flow out of the pump/transducer device 2700 (from the electrically conductive membrane pumps) as shown by arrows 2706. Air will also flow from the cavity 2708 into the electrically conductive membrane pumps as shown by arrows 2707 resulting in speaker membrane 2702 moving downward. When the electrically conductive membranes 2701 are deflected upwards (as shown in FIG. 1B), air will flow into the pump/transducer device 2700 (into the electrically conductive membrane pumps) as shown by arrows 2706. Air will also flow into the cavity 2708 from the electrically conductive membrane pumps as shown by arrows 2707 resulting in speaker membrane 2702 moving upward.

FIG. 1C is an overhead view of pump/transducer device 2700. Line 2709 reflects the cross-section that is the viewpoint of cross-sectional views of FIGS. 1A-1B. FIGS. 1D-1E shows the flow of air (arrows 2707 and 2706, respectively) corresponding to the deflection downward of electrically conductive membranes 2701 and speaker membrane 2702 (which is shown in FIG. 1A). The direction of arrows 2707 and 2706 in FIGS. 1D-1E, respectively, are reversed when the deflection is upward (which is shown in FIG. 1B).

The basic operation for pump/transducer 2700 is as follows. A time-varying stator voltage causes the pump membranes 2701 to move and create pressure changes within the speaker chamber 2708. These pressure changes cause the speaker membrane 2702 to move in synch with the pump membranes 2701. This speaker membrane motion produces audible sound.

The ability to stack pumps in a compact way greatly increases the total audio power. Such a pump/transducer stacked system 2800 is shown in FIG. 2.

For the embodiments of the present invention shown in FIGS. 1A-1E and 2, the individual pump membranes 2701 can be smaller or larger than the speaker membrane 2702 and still obtain good performance.

Pump/transducer system 2700 (as well as pump/transducer speaker stacked system 2800) can operate at higher audio frequencies due to axial symmetry (symmetrical with respect to the speaker membrane 2702 center). Each membrane pump is approximately the same distance from the speaker membrane 2702 which minimizes the time delay between pump membrane motion and speaker membrane motion (due to the speed of sound) which in turn allows the pumps to operate at higher pumping/audio frequencies.

It also means that pressure waves from each membrane pump 2701 arrive at the speaker membrane 2702 at about the same time. Otherwise, an audio system could produce pressure waves that are out of synch (due to the difference in distance between each pump and the speaker membrane) and thus these waves can partially cancel (lowering audio power) at certain pumping/audio frequencies.

Pump/transducer system 2700 (as well as pump/transducer speaker stacked system 2800) further exhibit increased audio power. Since all the air enters/exits from the sides of the membrane pump, these pumps can be easily stacked (such as shown in FIG. 2) to significantly increase sound power. Increasing the number of pump stacks (also referred to "pump cards") from one to four (as shown in FIG. 2) increases audio power by approximately a factor of 16 As can be seen in FIG. 2, the gas within the chamber is sealed by the membrane pump membranes and the speaker membrane. The gas in the sealed chamber can be air or another gas such as sulfur hexafluoride that can withstand higher membrane pump voltages than air.

Audio output is approximately linear with electrical input (resulting in simpler/cheaper electronics/sensors). Another advantage of the design of pump/transducer 2700 is the way the pump membranes 2701 are charged relative to the gates/stators. These are referred to as "stators," since the term "gate" implies electrical switching. Pump/transducers have a low resistance membrane and the force between the stator and membrane is always attractive. This force also varies as the inverse square of the distance between the pump membrane and stator (and this characteristic can cause the audio output to be nonlinear/distorted with respect to the electrical input). The membrane can also go into "runaway" mode and crash into the stator. Thus, in practice, the amplitude of the membrane in pump-transducer is limited to less than half of its maximum travel (which lowers pumping speed and audio power).

The issues resulting from non-linear operation are solved in the design of pump/transducer 2700 by using a high resistance membrane (preferably a polymer film like Mylar with a small amount of metal vapor deposited on its surface) that is charged by a DC voltage and applying AC voltages to both stators (one stator has an AC voltage that is 180 degrees out of phase with the other stator). A high value resistor (on the order of $10^8$ ohms) may also be placed between the high resistance membrane (on the order of $10^6$ to $10^{12}$ ohms per square) and the source of DC voltage to make sure the charge on the membrane remains constant (with respect to audio frequencies).

Because the pump membrane 2701 has relatively high resistance (though low enough to allow it to be charged in several seconds) the electric field between one stator and the other can penetrate the charged membrane. The charges on the membrane interact with the electric field between stator traces to produce a force. Since the electric field from the stators does not vary as the membrane moves (for a given stator voltage) and the total charge on the membrane remains constant, the force on the membrane is constant (for a give stator voltage) at all membrane positions (thus eliminating the runaway condition and allowing the membrane to move within its full range of travel). The electrostatic force (which is approximately independent of pump membrane position) on the membrane increases linearly with the electric field of the stators (which in turn is proportional to the voltage applied to the stators) and as a result the pump membrane motion (and also the speaker membrane 2702 that is being driven by the pumping action of the pump membrane 2701) is linear with stator input voltage. This linear link between stator voltage and pump membrane motion (and thus speaker membrane motion) enables a music voltage signal to be routed directly into the stators to produce high quality (low distortion) music.

FIG. 3 depicts an electrically conductive membrane pump/transducer 3000 that is similar to the pump/transducers 2700 and 2900, in that it utilizes an array of electrically conductive membrane pumps. Pump/transducer 3000 does not utilize a speaker membrane (such as in pump/transducer 2700) or a structure in place of the speaker membrane (such as in pump/transducer 2900). Pump/transducer 3000 produces substantial sound even without a speaker membrane. Applicant believes the reason that there is still good sound power is that the membrane pumps are compressing the air as it makes its way out of the inner vents (increasing the pressure of an time-varying air stream increases its audio power). Arrows 3001 show the flow of air through the inner vents. The pump/transducer 3000 has a chamber that receives airflow 3001 and this airflow exhausts out the chamber by passing through the open area (the chamber exhaust area) at the top of the chamber. In order to produce substantial sound the total area of the membrane pumps must be at least 10 times larger than the chamber exhaust area.

FIG. 3 also shows an alternate vent configuration that has holes 3003 in the stators that allow air to flow to separate vent layers. The cross-sectional airflow area of the vents (through which the air flow is shown by arrows 3001) is much smaller than the pump membrane area (so that the air is compressed). FIG. 3 also shows how a simple housing 3004 can direct the desired sound 3005 toward the listener (up as shown in FIG. 3) and the undesired out of phase sound away from the listener (down as shown in FIG. 3). The desired sound 3005 is in the low sub-woofer range to mid-range (20 Hz to about 3000 Hz).

FIG. 4 depicts an electrically conductive membrane pump/transducer 3100 that is the pump/transducer 3000 that also includes an electrostatic speaker 3101 (which operates as a "tweeter"). An electrostatic speaker is a speaker design in which sound is generated by the force exerted on a membrane suspended in an electrostatic field. The desired sound 3102 from the electrostatic speakers 3101 is in a frequency in the range of around 2 to 20 KHz (generally considered to be the upper limit of human hearing). Accordingly, pump/transducer 3100 is a combination system that includes a low/mid-range speaker and a tweeter speaker.

FIG. 5 depicts an electrically conductive membrane pump/transducer 3200 that is the pump/transducer 3100 that further includes the speaker membrane 3202 (such as in pump/transducer 2700).

SUMMARY OF THE INVENTION

The present invention relates to a loudspeaker having pump cards that each include an array of electrically conductive membrane transducers (such as polyester-metal membrane pumps). The array of electrically conductive membrane transducers combine to generate the desired sound by the use of pressurized airflow.

In general, in one aspect, the invention features an electroacoustic transducer that includes an electrically conductive stator having a first side and a second side. The electroacoustic transducer further includes a first vent member on the first side of the electrically conductive stator. The first vent member has a plurality of first vent fingers. The electroacoustic transducer further includes a second vent member on the second side of the electrically conductive stator. The second vent member has a plurality of second vent fingers. The electroacoustic transducer further includes a first frame connected to the first vent member. The electroacoustic transducer further includes an electrically conductive membrane connected to the first frame.

Implementations of the invention can include one or more of the following features:

The electroacoustic transducer can further include a second frame connected to the second vent member.

The total thickness of the electroacoustic transducer can be less than 2 mm.

The total thickness of the electroacoustic transducer can be less than 1 mm.

The electroacoustic transducer can have a total thickness. The electrically conductive membrane can have a peak amplitude that exceeds 20% of the total thickness of the electroacoustic transducer. The electrically conductive membrane can have a peak amplitude that exceeds 40% of the total thickness of the electroacoustic transducer.

The electrically conductive membrane can be supported on all sides by the first frame.

The first frame can be electrically conductive.

The first frame can include metal. The metal can include stainless steel.

The first frame can have a width that is at least five times its thickness.

The electroacoustic transducer can further include an insulating film bonded to the first side of the electrically conductive stator and the second side of the electrically conductive stator.

The insulating film can be bonded to the electrically conductive stator using a thermal laminator.

The electroacoustic transducer can further include an insulating film bonded to a first side of the first frame and a second side of the first frame.

The insulating film can be bonded to the first frame using a thermal laminator.

The electrically conductive stator can include metal. The metal can include stainless steel.

The electrically conductive stator can be between 1 cm and 5 cm wide.

The electrically conductive stator can have a thickness between 25 μm and 125 μm.

The first frame can have a thickness between 25 μm and 125 μm.

The first vent member can be an electrical insulator.

The first vent member can include fiberglass.

The thickness of the first vent member can be between 0.2 mm and 1 mm.

The plurality of first vent fingers can be between 5 and 50 first vent fingers. The plurality of the second vent figures can be between 5 and 50 second vent fingers.

The first vent member can be translucent.

The first vent member can be optically transparent.

The electrically conductive membrane can be subjected to an antistatic process using an alpha particle emitter.

In general, in another aspect, the invention features a loudspeaker that includes a stack of a plurality of electroacoustic transducers. At least some of the electroacoustic transducers in the plurality of electroacoustic transducers each include an electroacoustic transducer that includes an electrically conductive stator having a first side and a second side. The electroacoustic transducer further includes a first vent member on the first side of the electrically conductive stator. The first vent member has a plurality of first vent fingers. The electroacoustic transducer further includes a second vent member on the second side of the electrically conductive stator. The second vent member has a plurality of second vent fingers. The electroacoustic transducer further includes a first frame connected to the first vent member. The electroacoustic transducer further includes an electrically conductive membrane connected to the first frame.

Implementations of the invention can include one or more of the following features:

The stack of the plurality of electroacoustic transducers can have between 50 and 500 electroacoustic transducers.

The loudspeaker can further include a metal grill and a plurality of electronic components that are at least partially in thermal contact with the metal grill.

The operation of the stack can create airflow through the device grill that indirectly cools an electronic component.

The stack can serve as its own baffle.

The electrically conductive membranes in the stack can have a total area that is at least 10 times larger than the face area of the stack.

The stack can be less than 30 cm tall.

In general, in another aspect, the invention features an electroacoustic transducer that includes an electrically conductive solid stator having a first side and a second side. The electroacoustic transducer further includes a first vent member on the first side of the electrically conductive solid stator. The electroacoustic transducer further includes a second vent member on the second side of the electrically conductive solid stator. The electroacoustic transducer further includes a first frame connected to the first vent member. The electroacoustic transducer further includes an electrically conductive membrane supported on the entire outside edge of the electrically conductive membrane by the first frame.

DESCRIPTION OF DRAWINGS

FIGS. 1A-1E (which are reproduced from Pinkerton '615 application) depict an electrically conductive membrane pump/transducer that utilizes an array of electrically conductive membrane pumps that cause a membrane to move in phase. FIGS. 1A-1B depict cross-section views of the pump/transducer. FIGS. 1C-1E depict overhead views of the pump/transducer.

Figure 2:
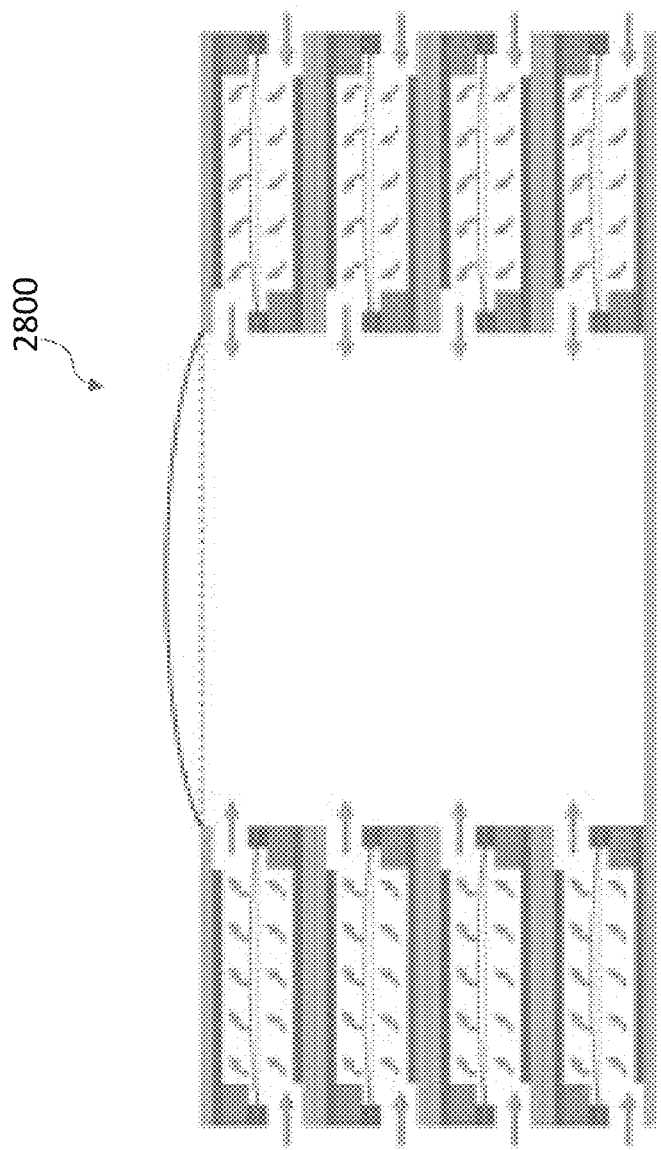
FIG. 2 (which is reproduced from Pinkerton '615 application) depicts an electrically conductive membrane pump/transducer that has a stacked array of electrically conductive membrane pumps.
Figure 3:
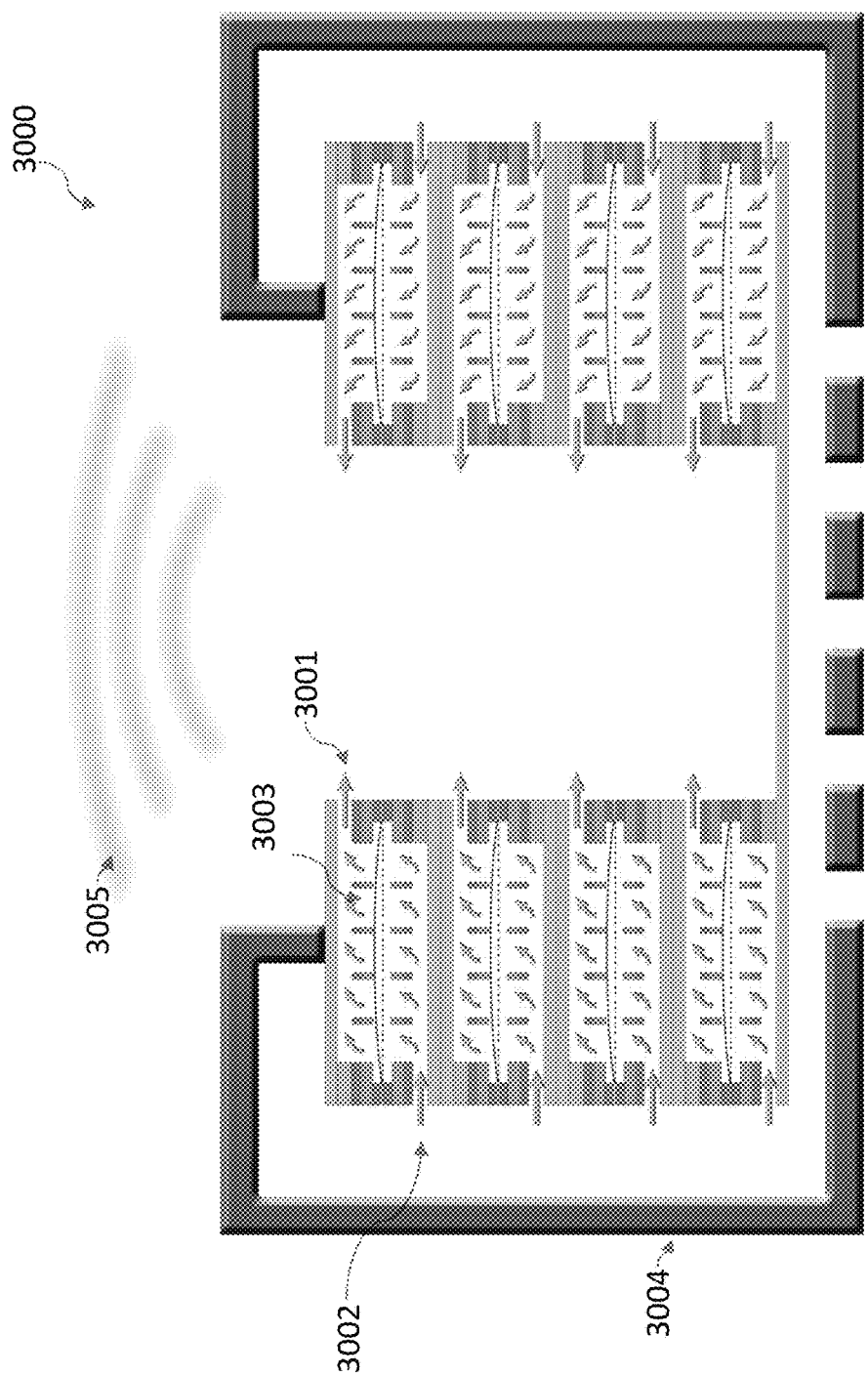
FIG. 3 (which is reproduced from Pinkerton '615 application) depicts an electrically conductive membrane pump/ transducer that utilizes an array of electrically conductive membrane pumps that operates without a membrane or piston.
Figure 4:
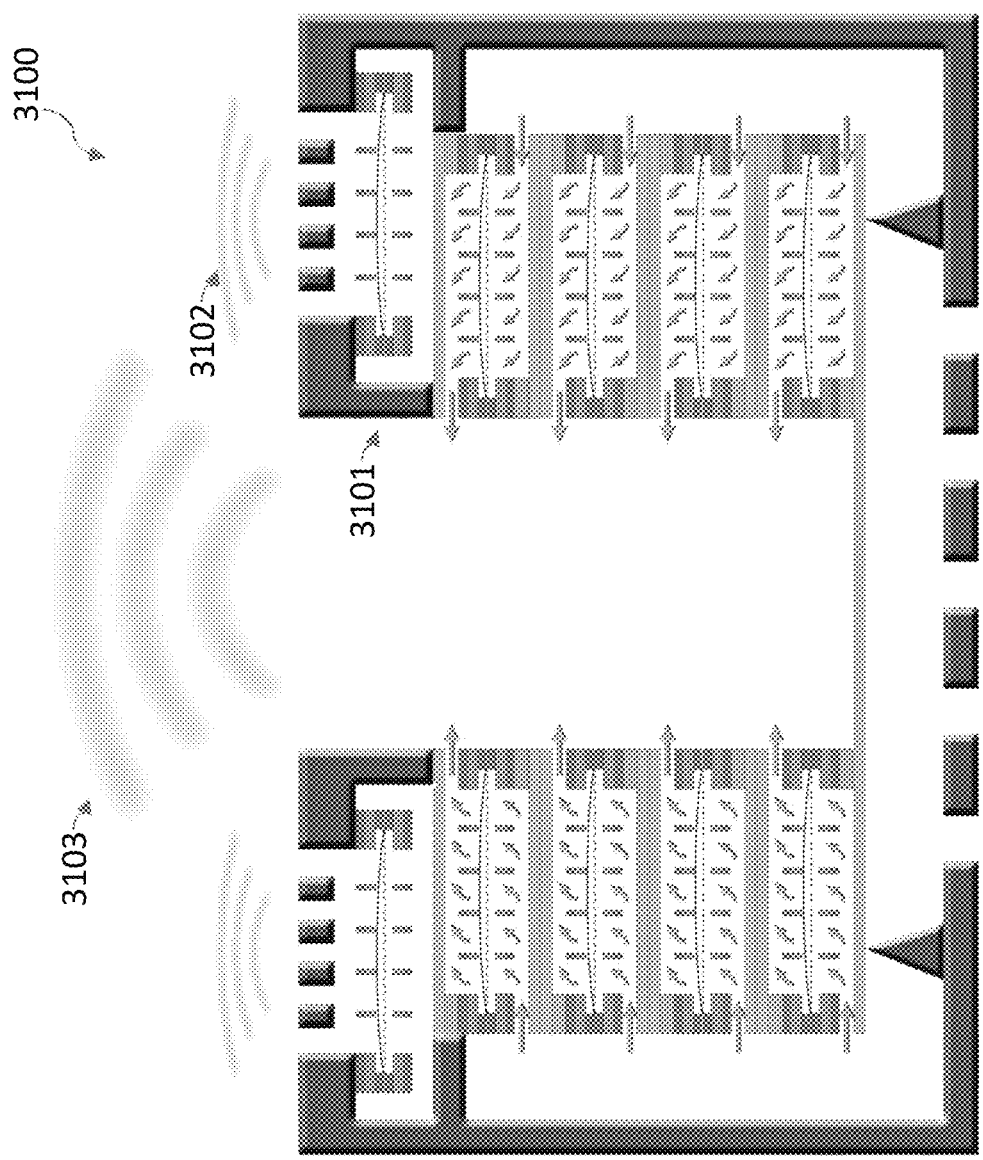

FIG. 4 (which is reproduced from Pinkerton '615 application) depicts an electrically conductive membrane pump/transducer 3100 that utilizes an array of electrically conductive membrane pumps and that also includes an electrostatic speaker.

Figure 5:
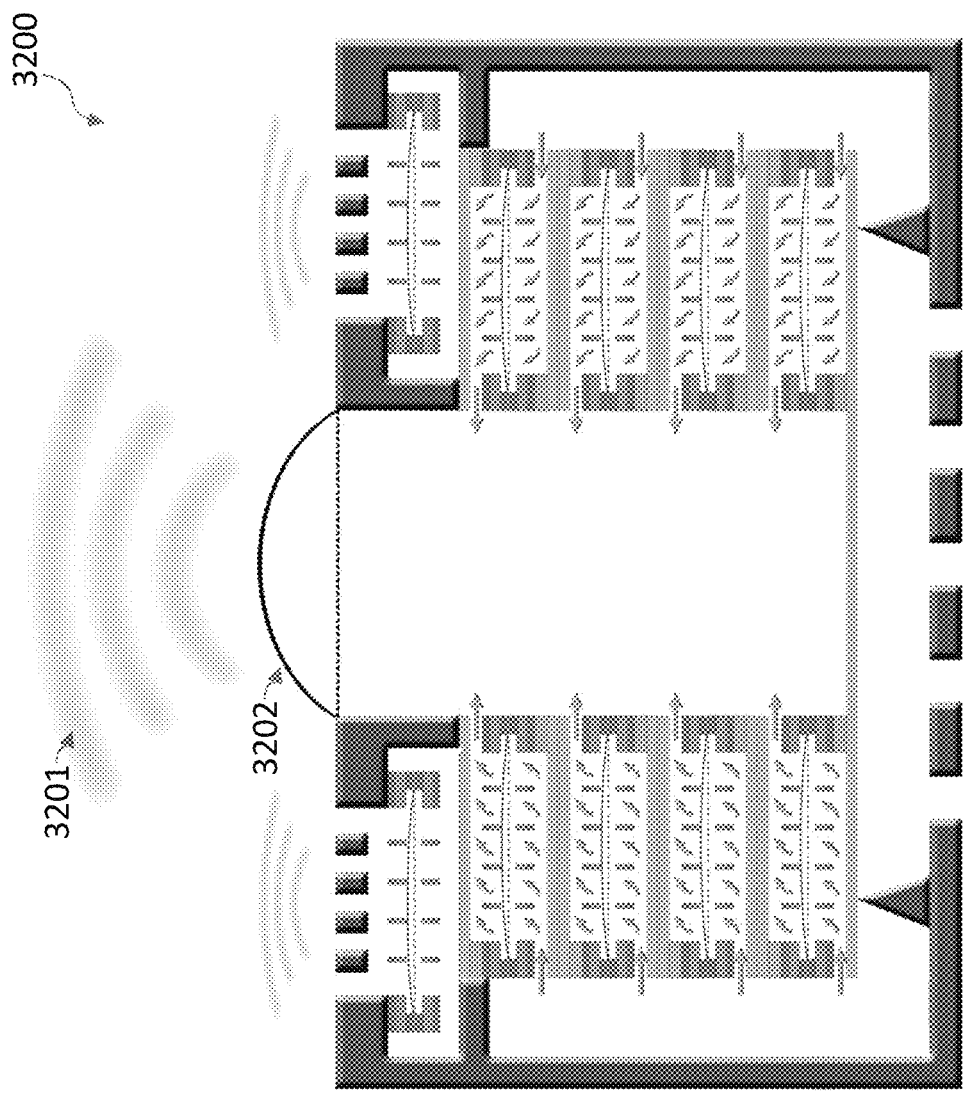

FIG. 5 (which is reproduced from Pinkerton '615 application) depicts an electrically conductive membrane pump/transducer 3200 that utilizes an array of electrically conductive membrane pumps that cause a membrane to move in phase and that also includes an electrostatic speaker.

Figure 6:
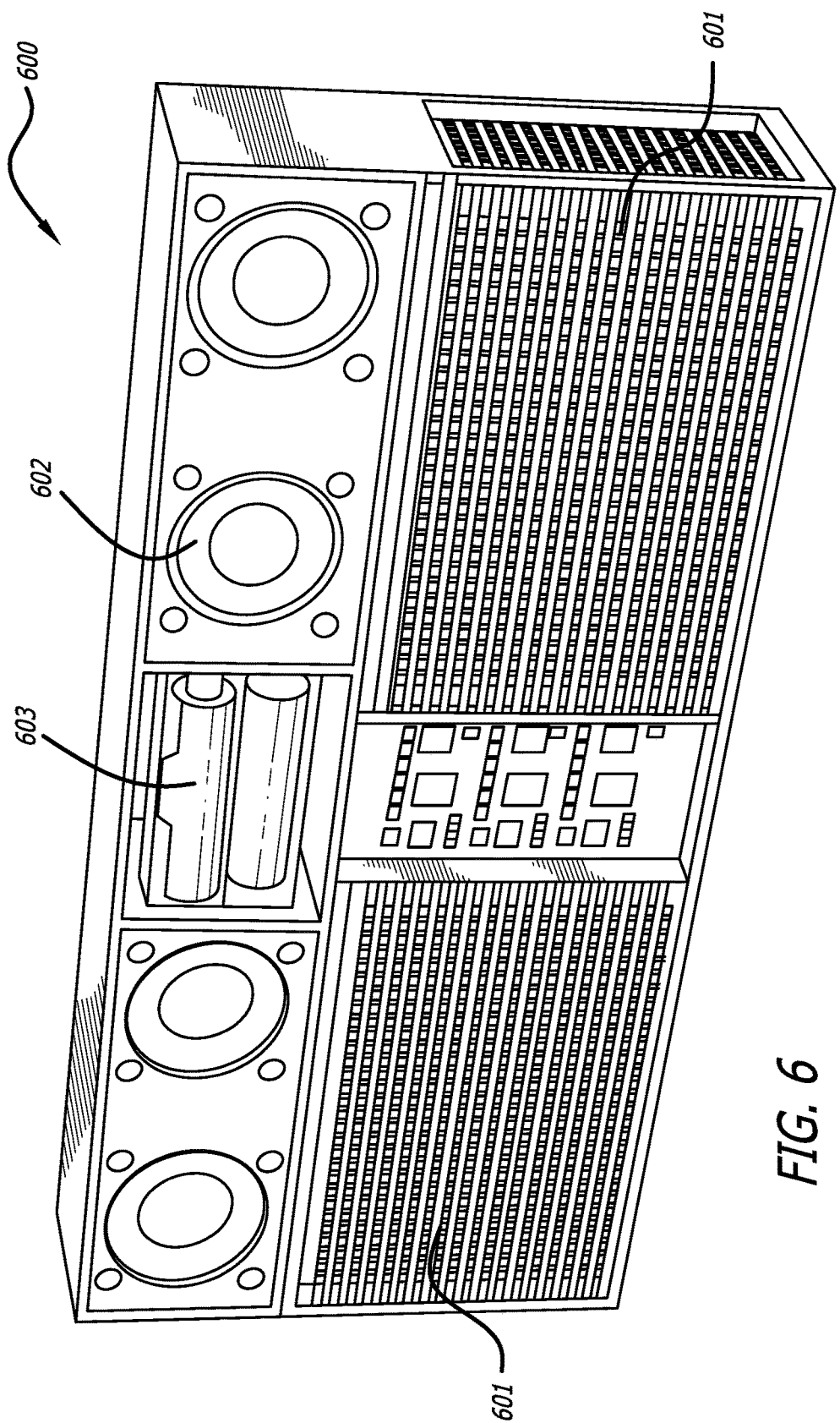

FIG. 6 illustrates a two stack device.

FIG. 7A is an illustration of the front of a prototype from Pinkerton '235 application.

Figure 7B:
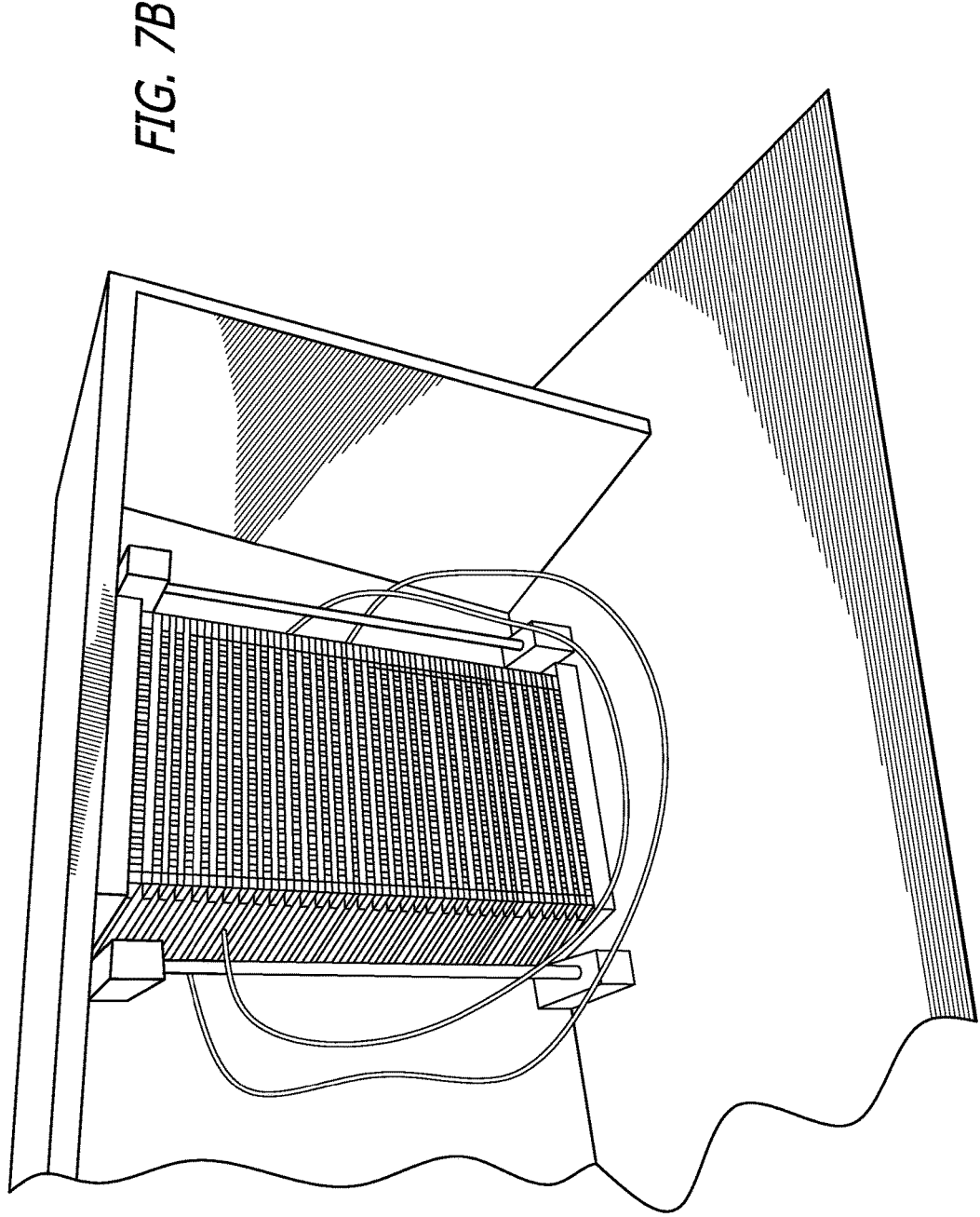

FIG. 7B is an illustration of the back of a prototype shown in FIG. 7A.

Figure 8:
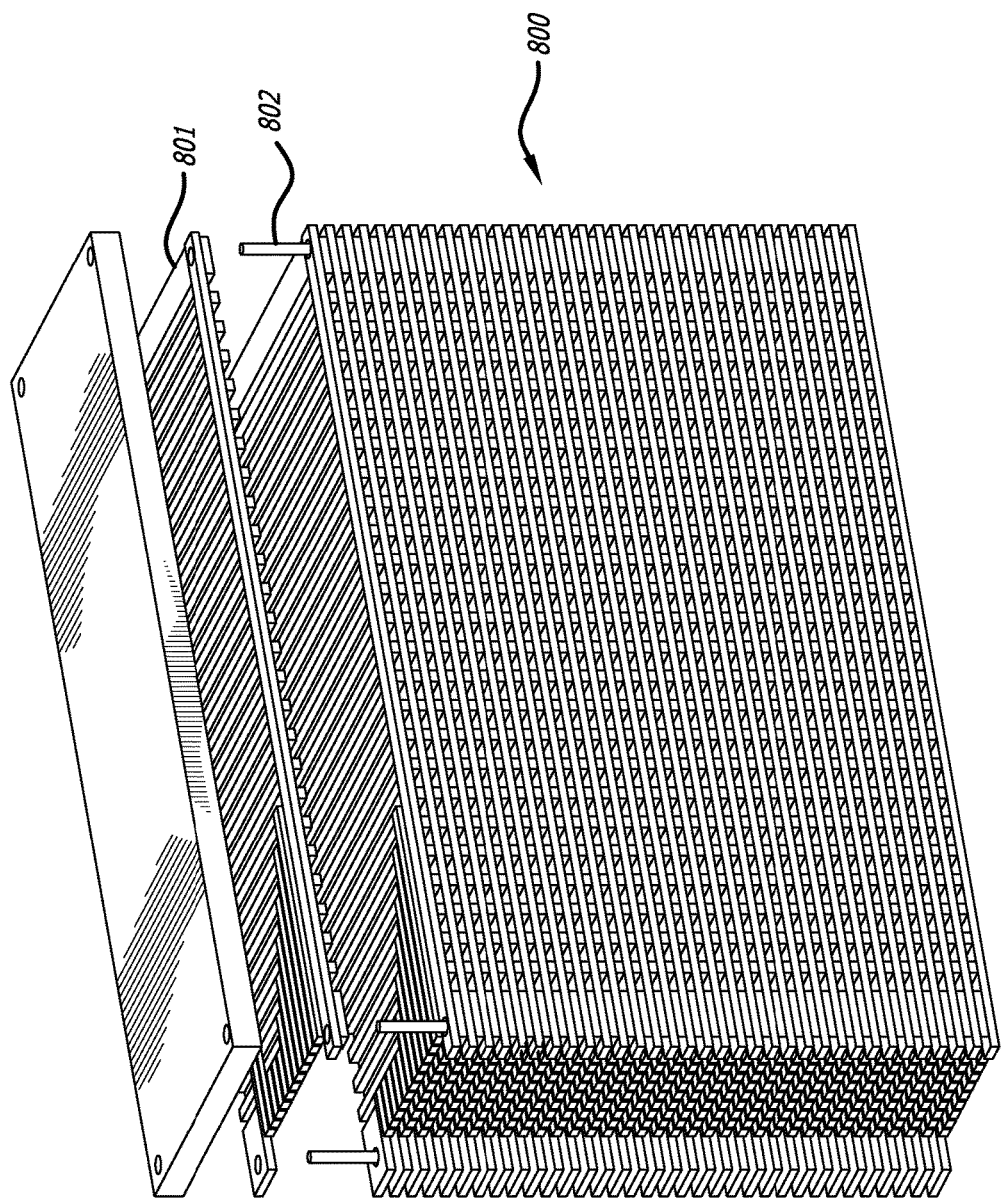

FIG. 8 is an illustration of a card stack.

Figure 9A:
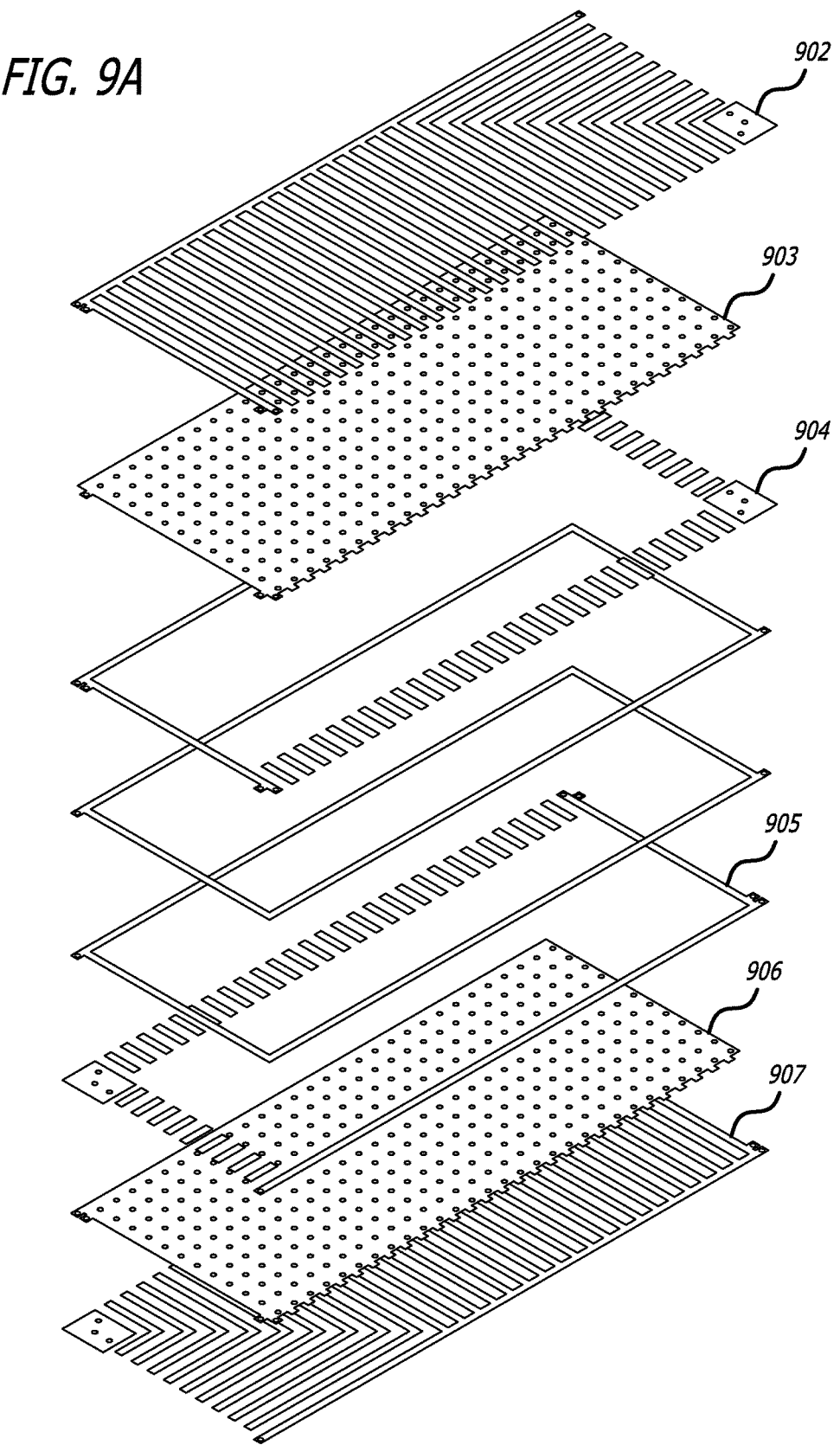

FIG. 9A is an illustration of an exploded view of a pump card.

FIG. 9B is a magnified view of a portion of the exploded view of the pump card illustrated in FIG. 9A.

Figure 10:
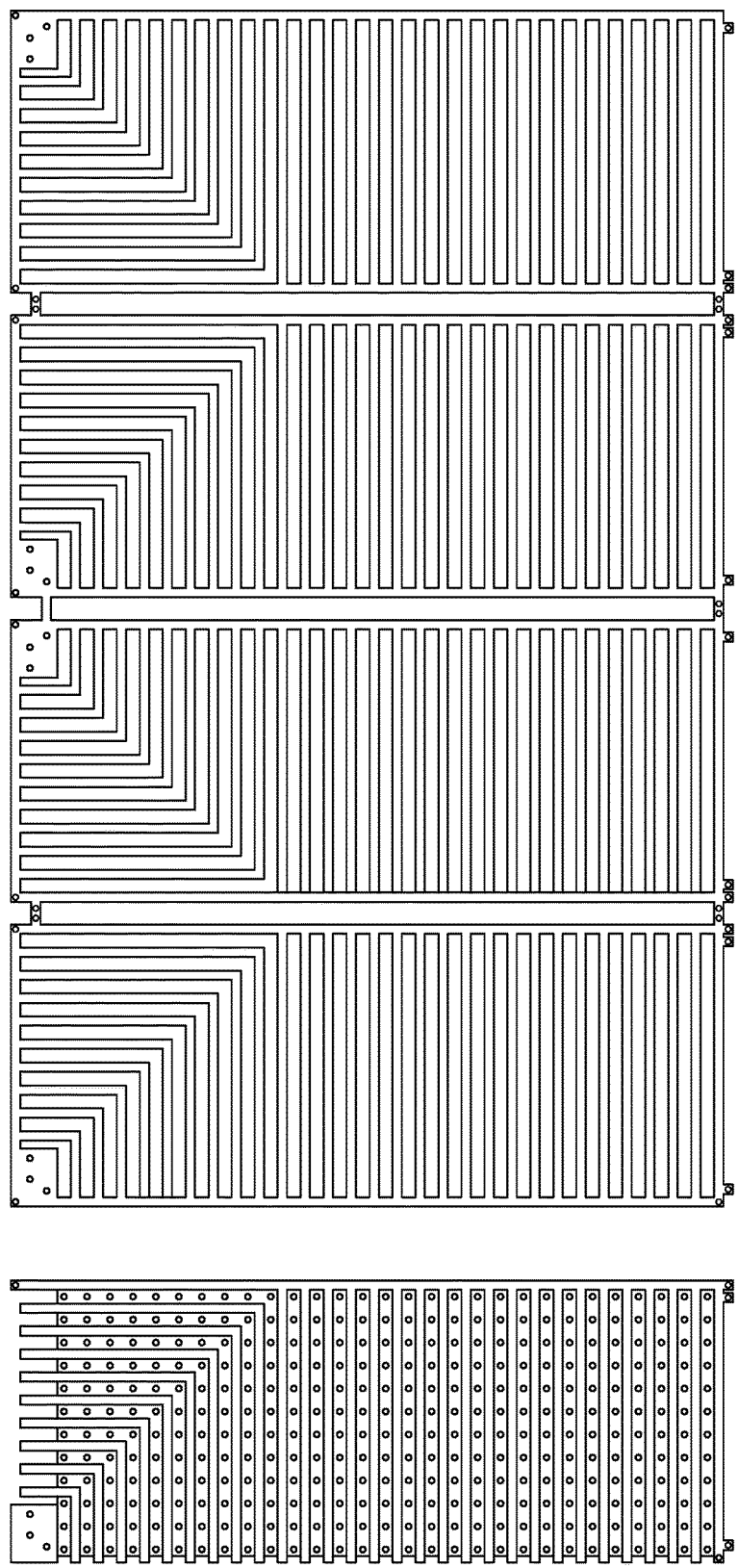

FIG. 10 is an illustration of a plastic/fiberglass stator vent assembly along with a finished pump/driver card.

Figure 11:
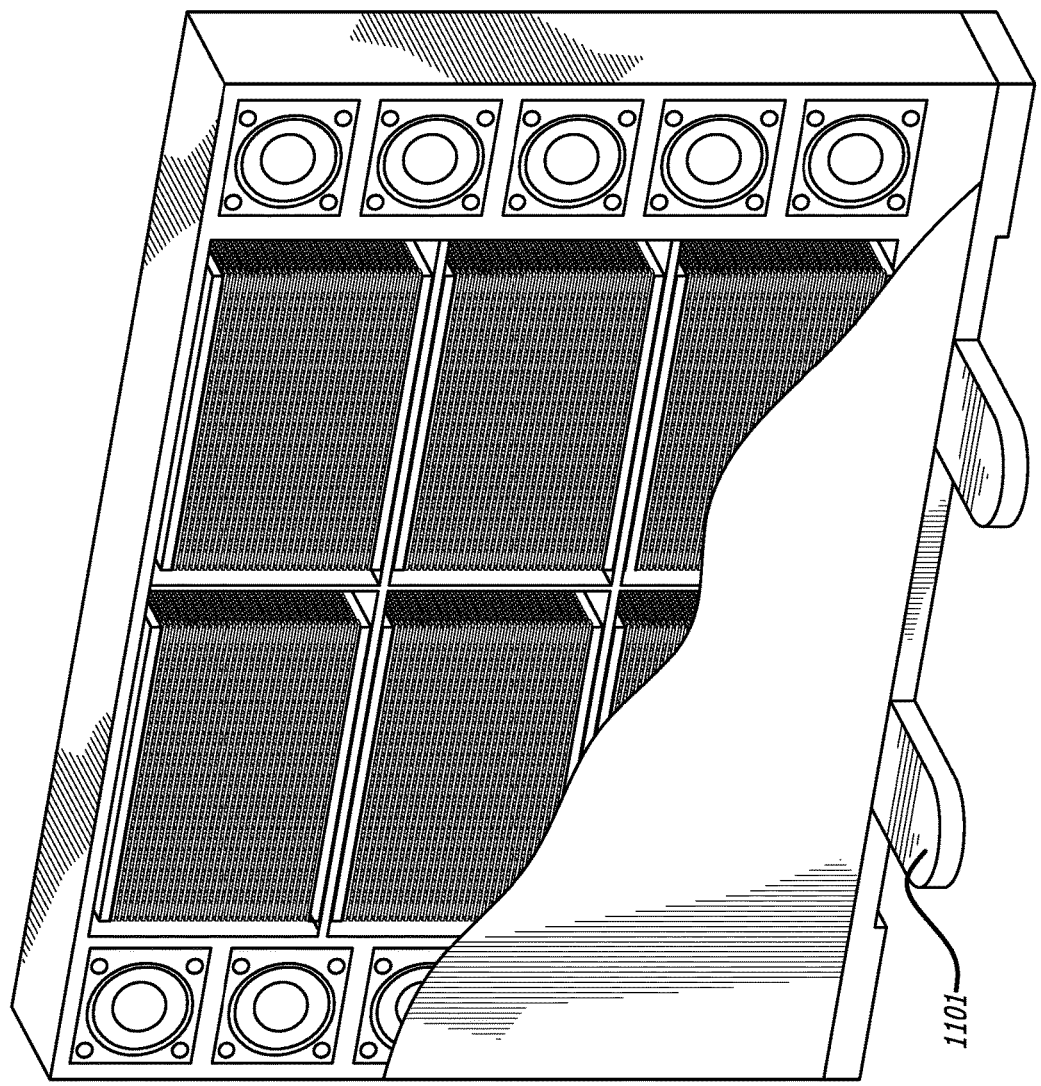

FIG. 11 illustrates a six stack device.

Figure 12:
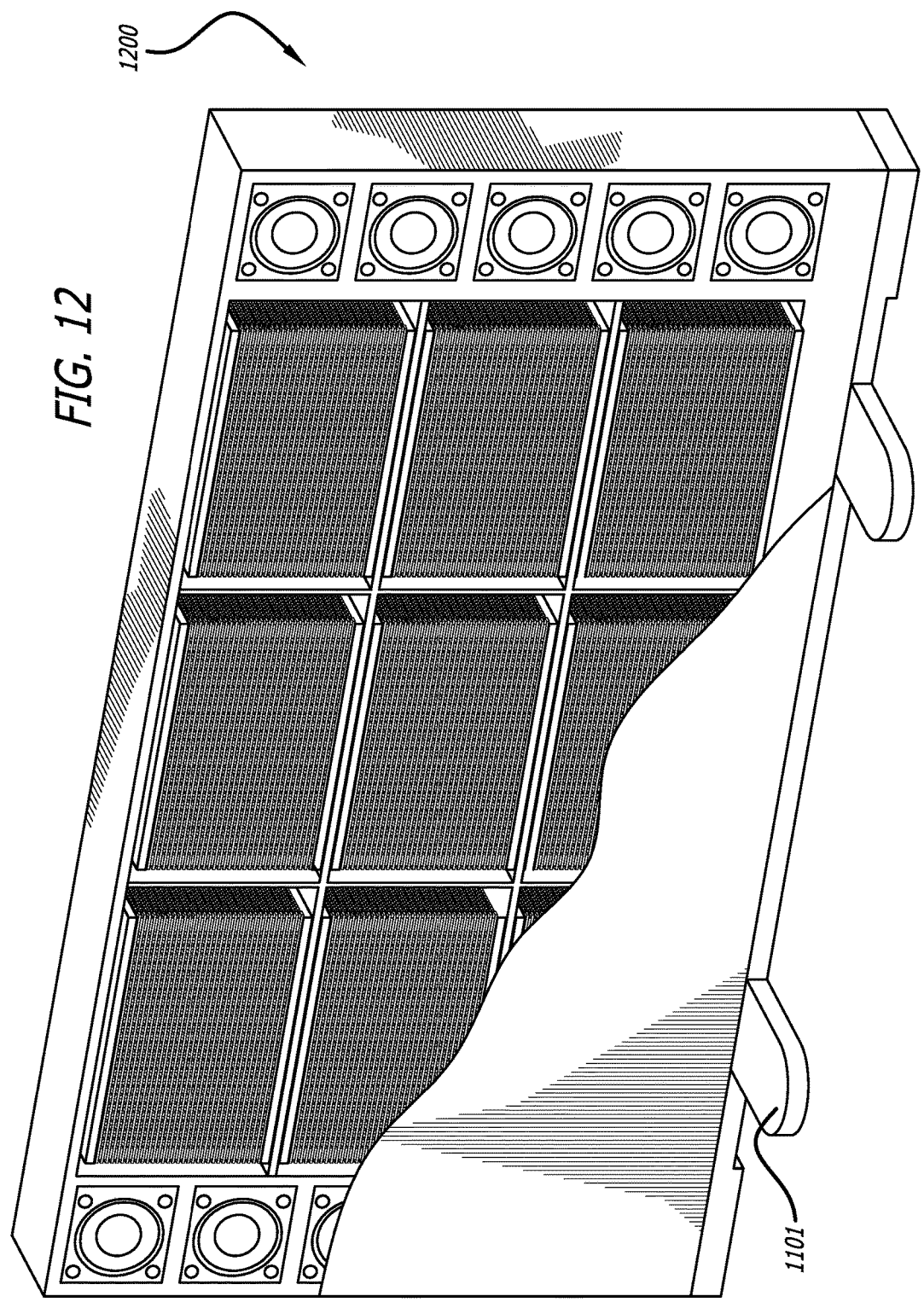

FIG. 12 illustrates a nine stack device.

Figure 13:
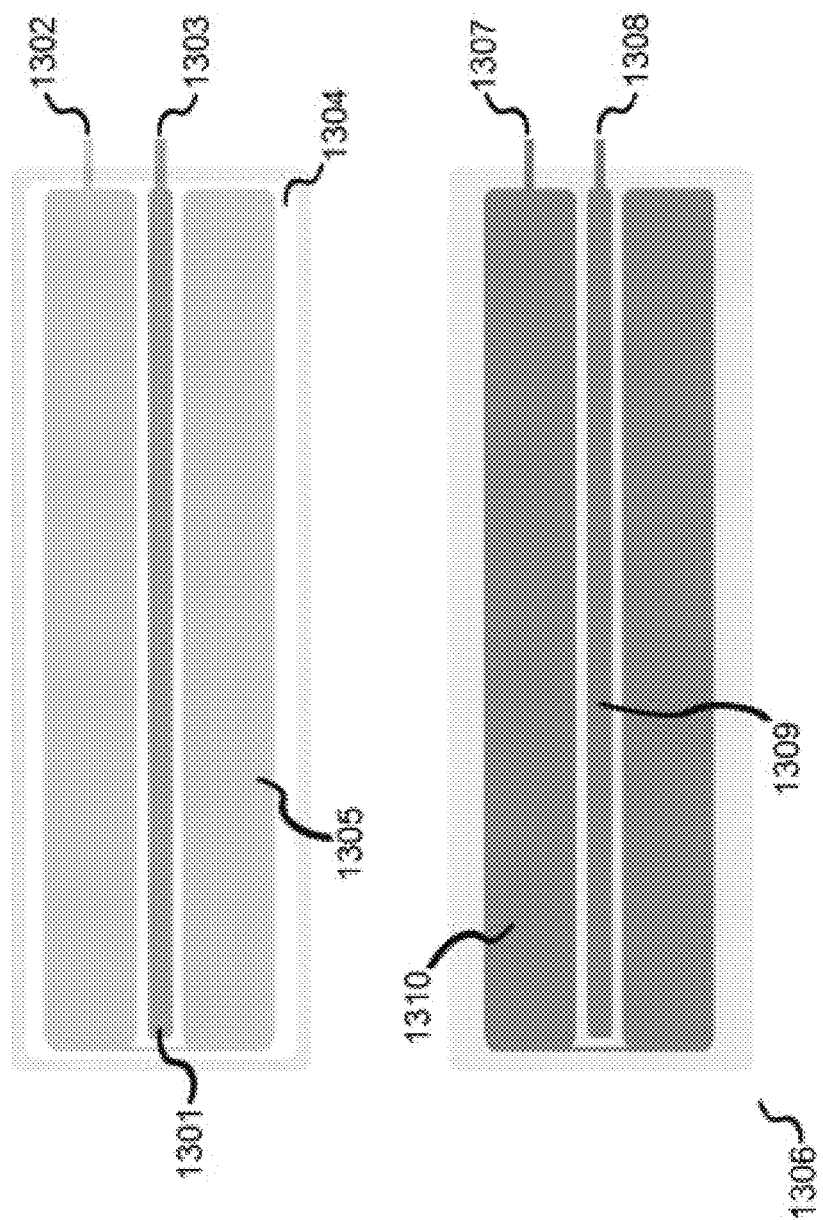

FIG. 13 illustrates a position sensor that can be integrated into a pump/driver card.

Figure 14:
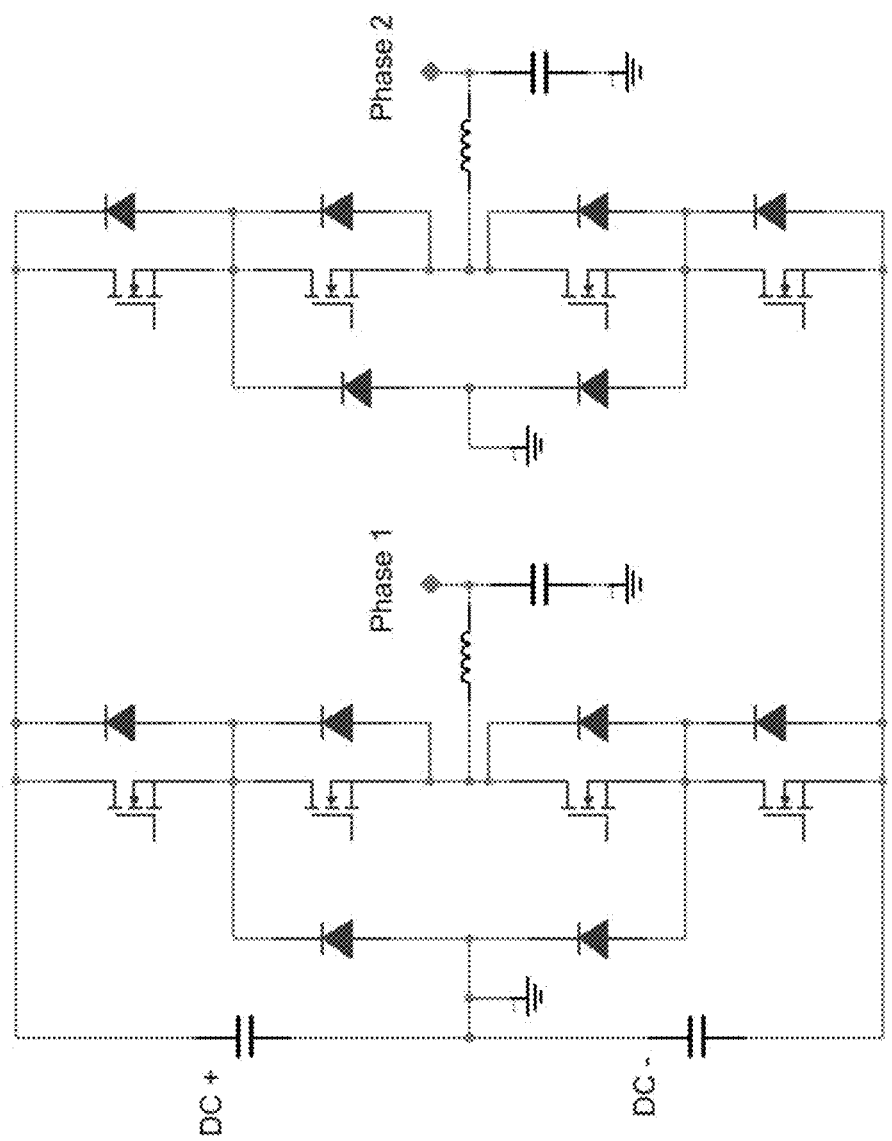

FIG. 14 is a circuit diagram of a two-phase, multilevel, neutral point clamped inverter composed of four transistors per phase, with neutral clamping diodes.

FIGS. 15A-15C depict an electrically conductive membrane pump/transducer that utilizes an array of electrically conductive membrane pumps that cause a membrane to move in phase. FIG. 15A depicts how airflow/sound can be directed out of a curved electroacoustic actuator at different angles. FIG. 15B depicts a cross section curved line that reflects the cross-section that is the viewpoint of FIG. 15C.

Figure 16A:
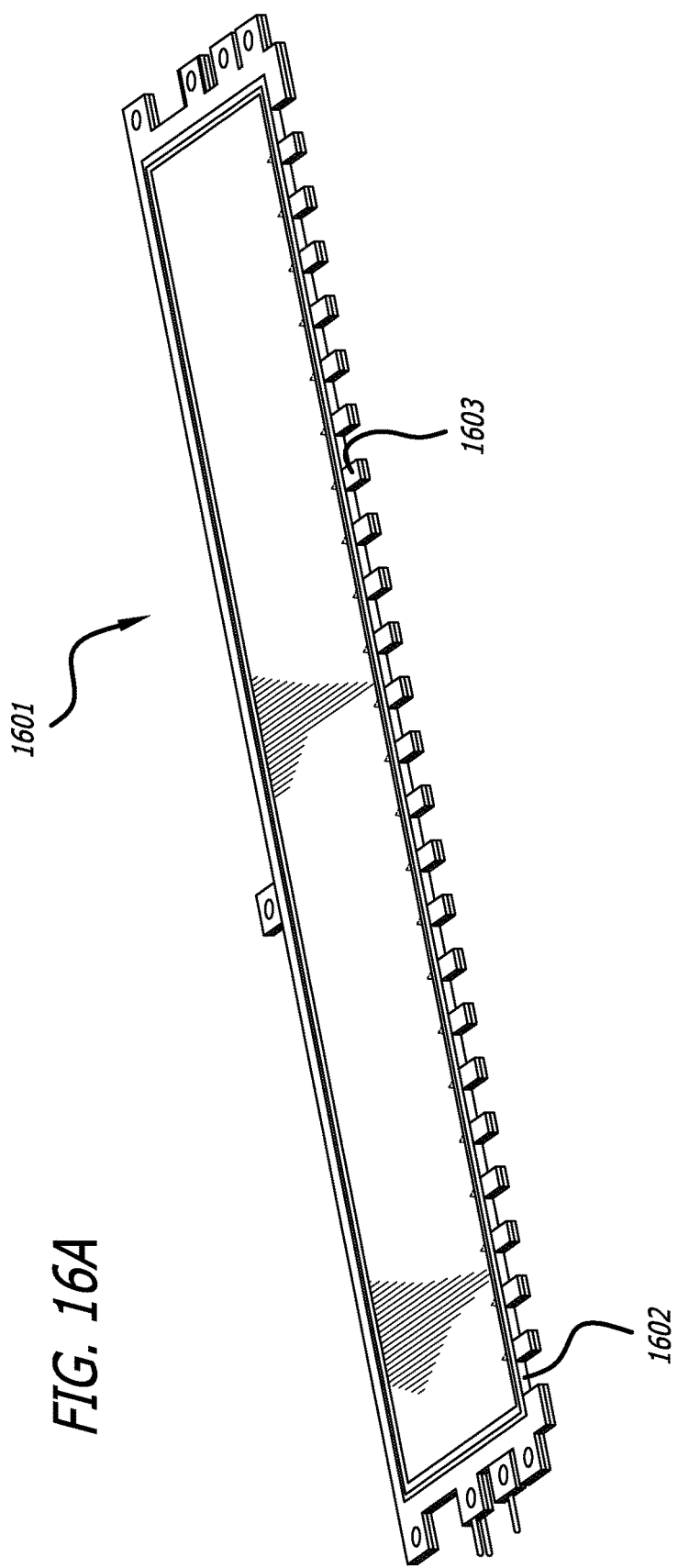

FIG. 16A illustrates an electroacoustic transducer ("ET," which is also referred to as a "pump card") and its solid stator.

Figure 16B:
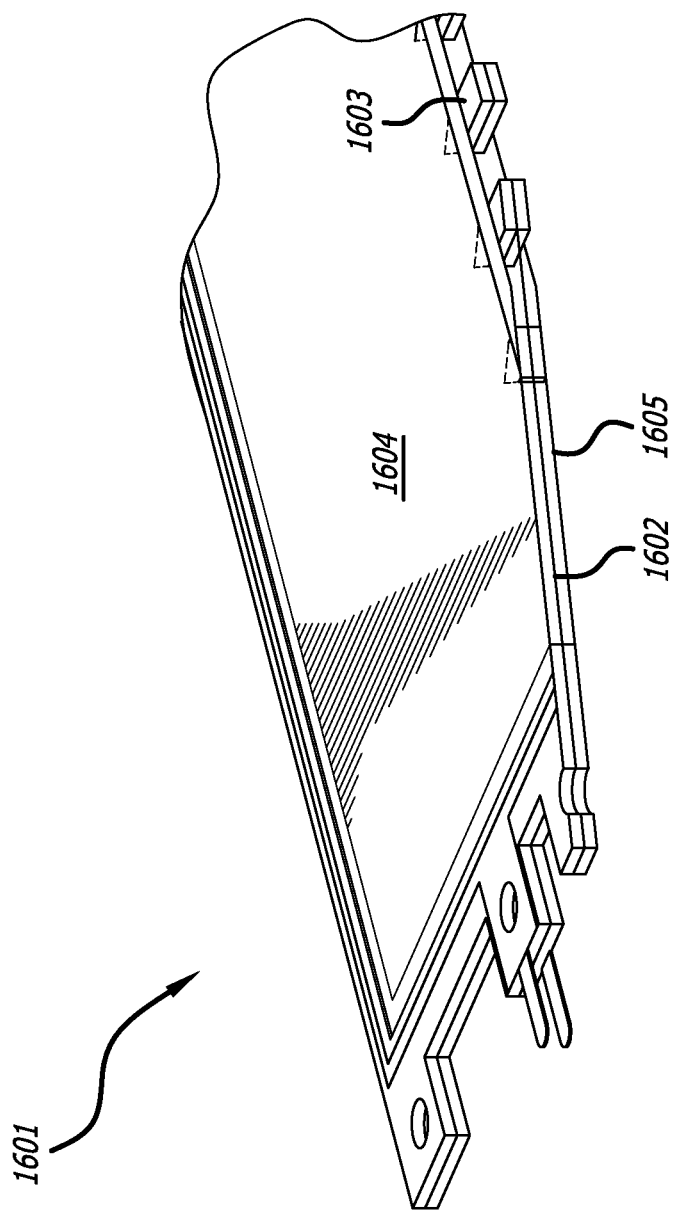

FIG. 16B is a magnified view of the electroacoustic transducer of FIG. 16A.

Figure 16C:
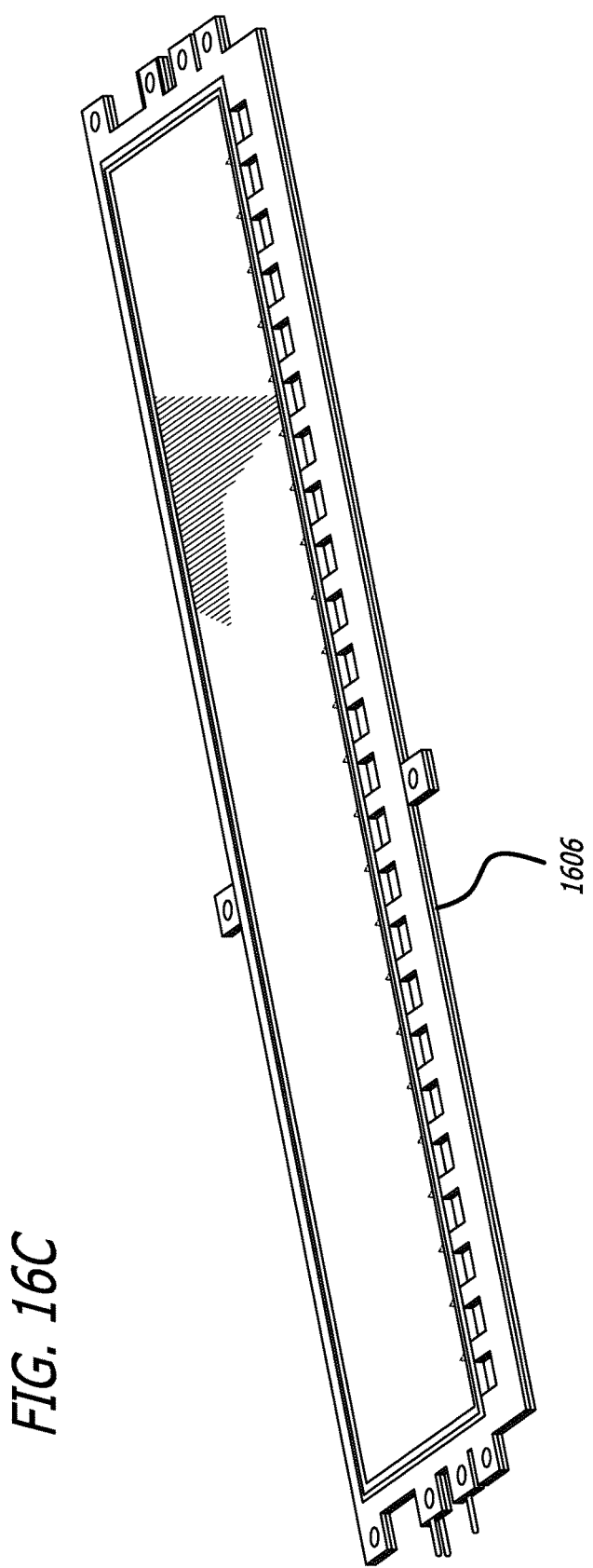

FIG. 16C illustrates the electroacoustic transducer of FIG. 16A having a single stator card before trimming off the vent fingers.

Figure 17:
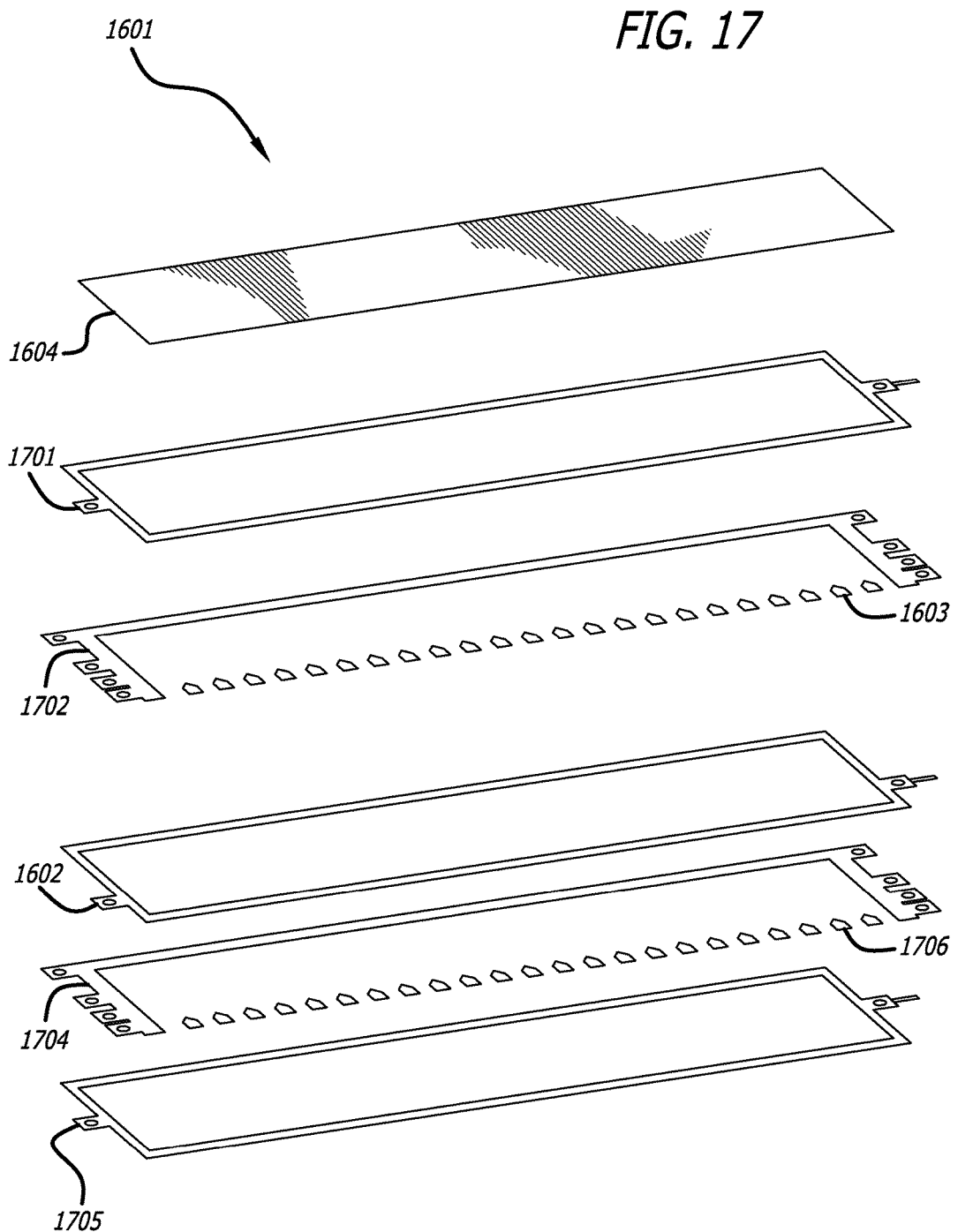

FIG. 17 is exploded view of the electroacoustic transducer of FIG. 15A.

Figure 18:
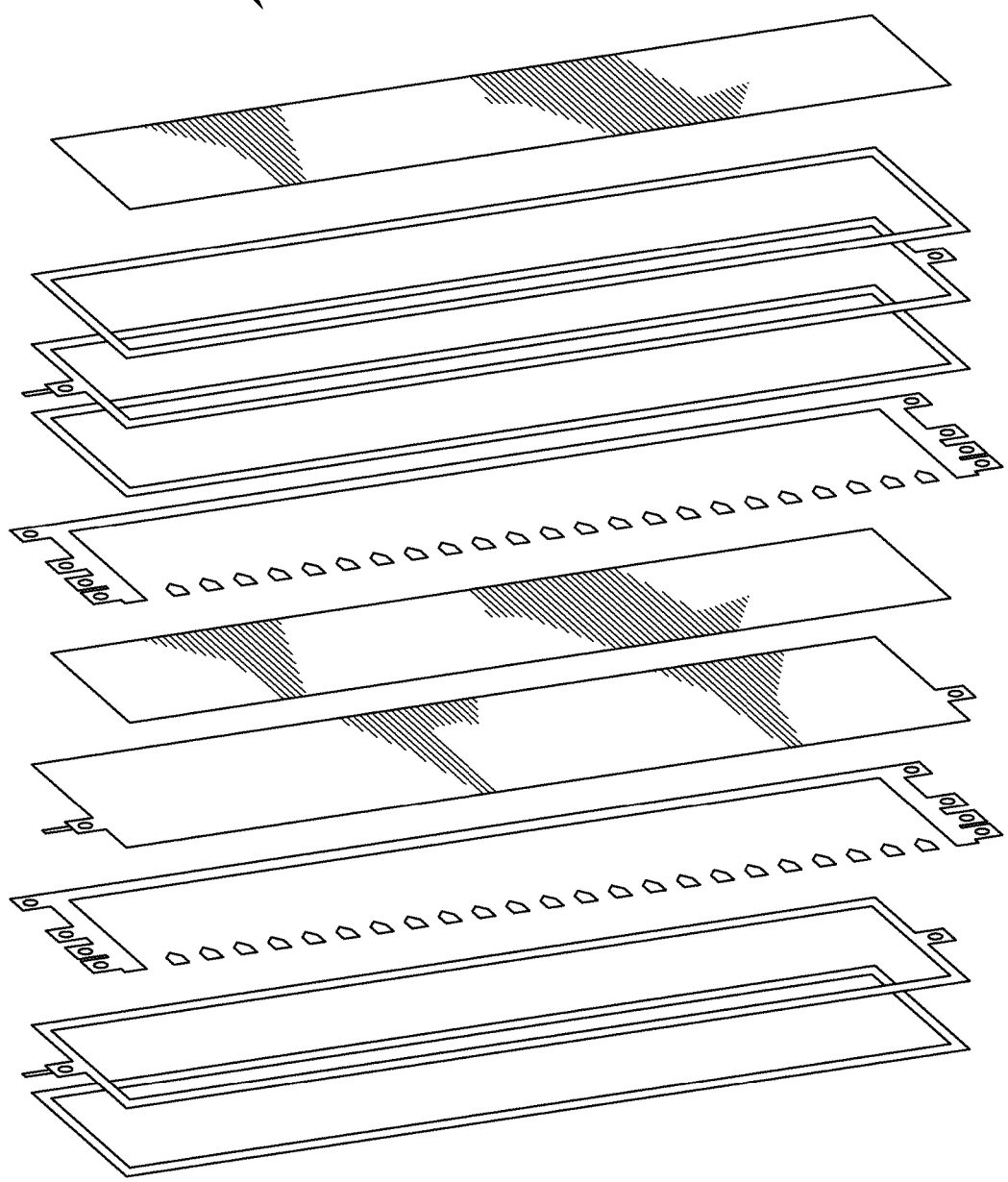

FIG. 18 is an exploded view of an electroacoustic transducer that has been laminated on both sides.

Figure 19:
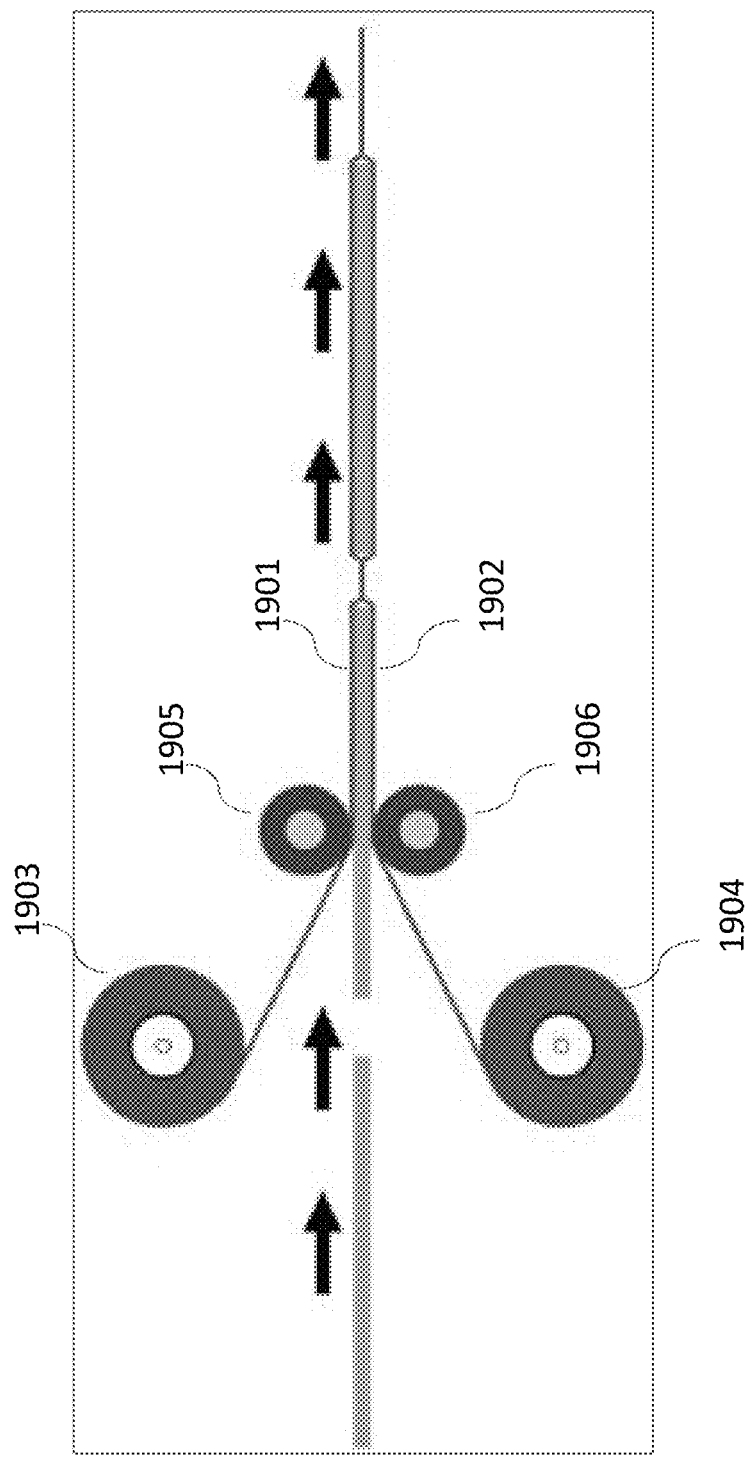

FIG. 19 is an illustration of a process to laminate the electroacoustic transducer shown in FIG. 18.

Figure 20:
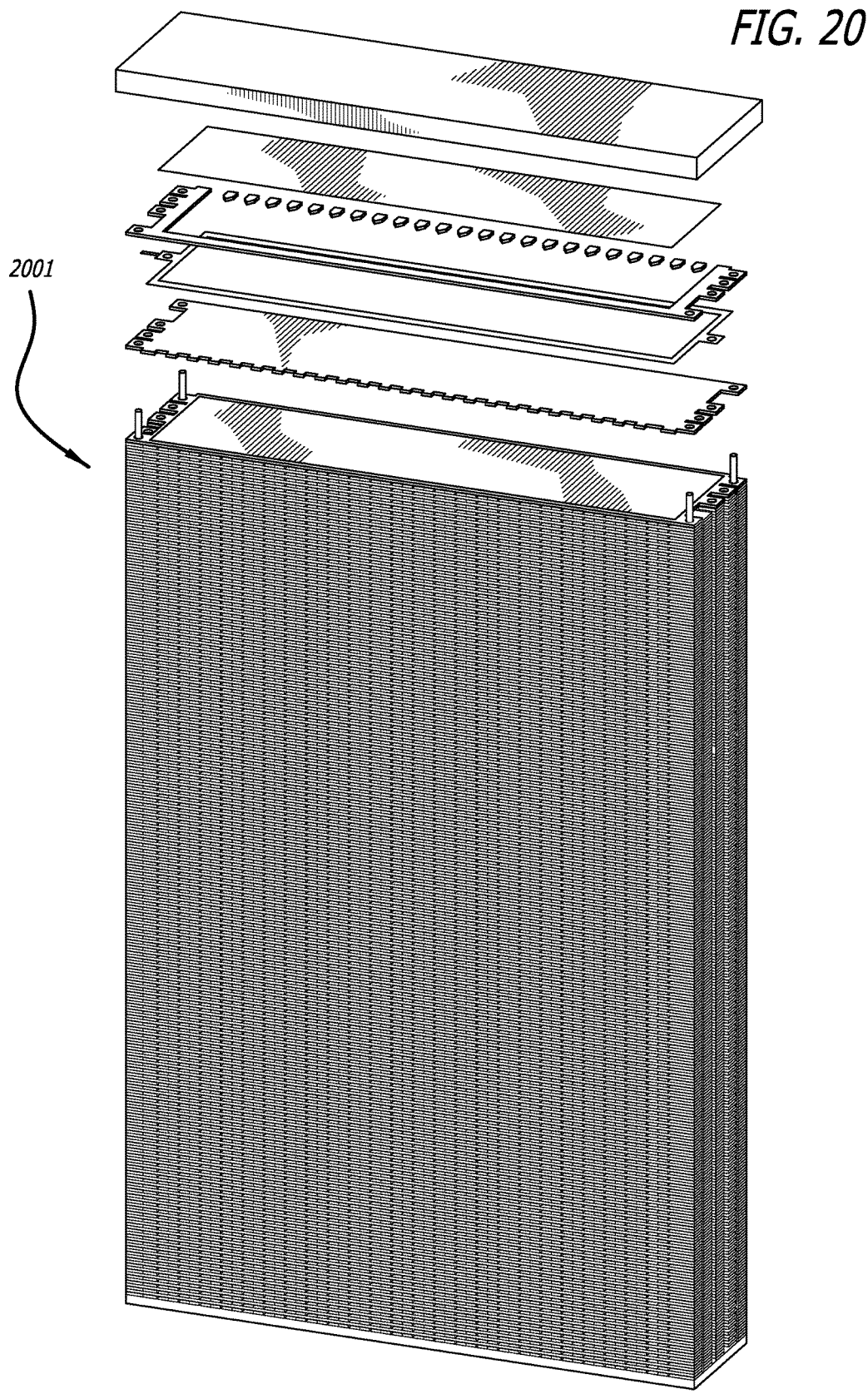

FIG. 20 illustrates a stack of electroacoustic transducers.

Figure 21:
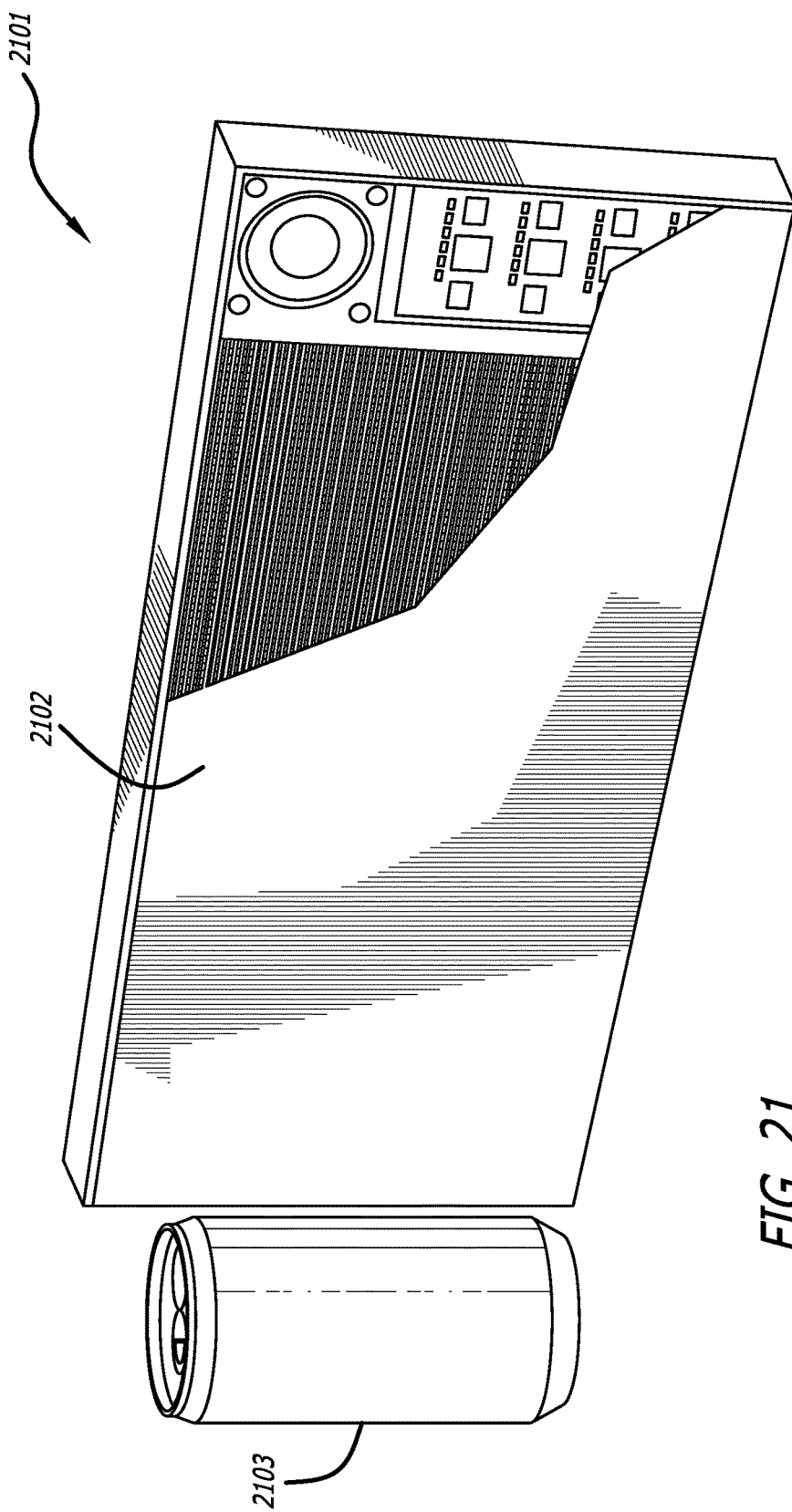

FIG. 21 illustrates a loudspeaker (that includes electrostatic transducers) with part of its protective grill removed.

Figure 22:
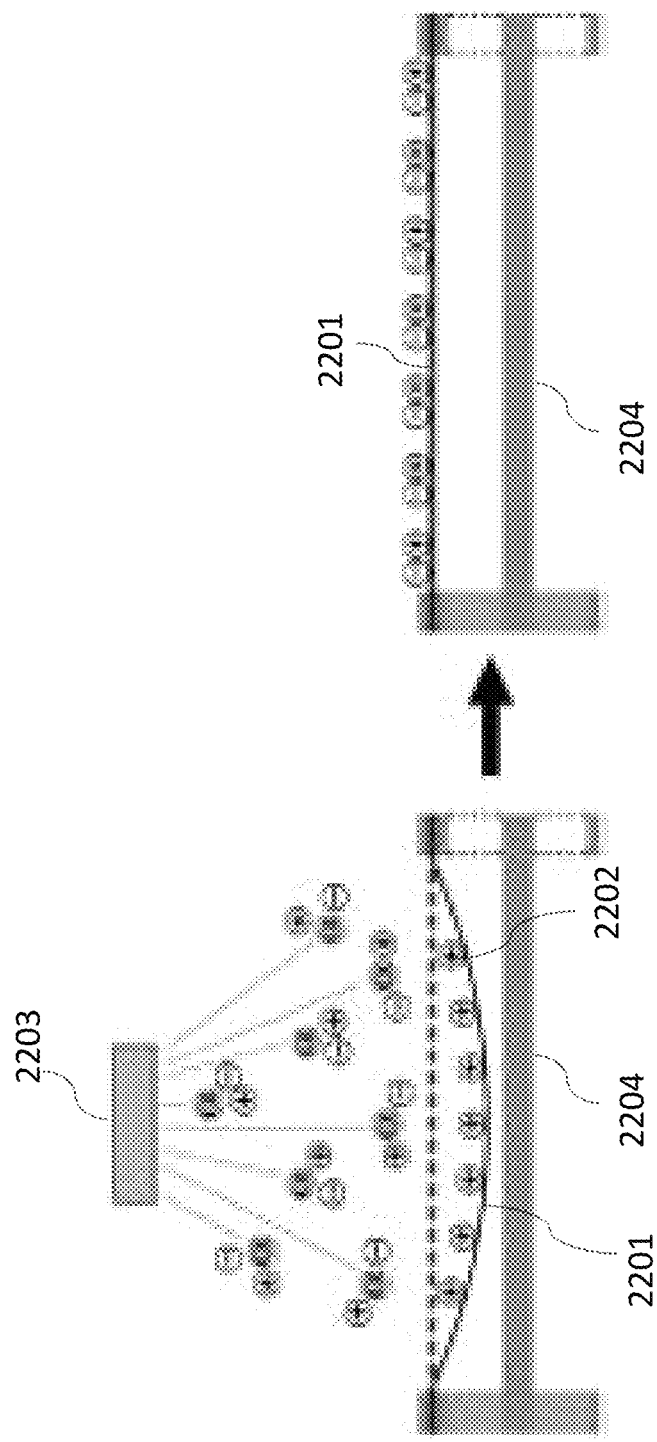

FIG. 22 illustrates how static charge from the membrane of the electronic transducer using an alpha particle emitter.

DETAILED DESCRIPTION

As set forth in the Pinkerton '615 application, it has been discovered that a loudspeaker having pump cards can generate good sound without the need for a rubber/PDMS membrane and that the use of a rubber/PDMS membrane can be avoided. It has further been discovered that using pump/driver cards to move air to/from the back of the device to the front (or front and side) of the device yields much less of a pressure drop than directing airflow toward a central chamber. By doing so, the pump cards are more efficient at low audio frequencies (20 Hz to 150 Hz) than higher frequencies (150 Hz to 20 kHz); accordingly, the embodiment of the present invention implements conventional electro-dynamic cone drivers above about 150 Hz. This was surprising as this exactly the opposite of what is taught in the art and sold commercially, which teaches that all electrostatic speakers using electro-dynamic cone drivers use them to handle low frequencies and electrostatic drivers to handle mid to high frequencies).

It was also discovered that powering the pump cards through a transformer (to boost the voltage from approximately 20 volts to +/−2 kV) below 150 Hz is inefficient; accordingly, the pump cards are driven directly with a +/−2 kV inverter. An improved switching method for this inverter is much more efficient that standard switching approaches.

A very high voltage digital audio amplifier, achieving greater than +/−2 kV, is implemented without the use of transformers or inductors using a multilevel neutral point clamped inverter topology and a novel control method. The control method involves operating the transistors of the inverter in a pseudo-linear, discrete pulsed mode with voltage feedback sensing to achieve the desired output waveform.

FIG. 14 shows a two-phase, multilevel, neutral point clamped inverter composed of four transistors per phase, with neutral clamping diodes, which ensure that no single transistor is exposed to more than ½ of the total DC bus voltage while in its off state. For example, this allows 1200 Volt rated transistors to be operated in a +/−2000 Volt DC bus environment. The output of the inverter is formed by an LC filter on each phase. Traditional control methods involve switching the input of the LC filter to either DC rail or to the neutral rail at high frequencies using pulse width modulation of the transistor gate inputs. The transistors are operated in their saturation mode creating high frequency rail to rail waveforms that are filtered by the LC filter to produce smooth waveforms at the output. The primary areas of concern with this mode of operation are: (a) the high switching losses in the transistors that occur while the devices transition in to and out of saturation; (b) the turn off voltage spikes due to the filter inductors (making it unsafe to operate the transistors near their maximum voltage rating); and (c) high losses in the inductors due the high frequency ripple current.

It should be noted that each phase of the of the inverter requires three floating, isolated gate power supplies and one isolated gate power supply referenced to the negative DC rail. These supply an isolated signaling device (e.g., an optocoupler). The signaling device is most easily operated with a discrete level digital pulse of a variable time duration.

The control method involves pulsing the gates of the transistors for short time durations at voltage levels near the turn on threshold of the devices. The pulses occur at a frequency equal to or higher than the sample rate of the audio signal. The pulses are tailored so the transistors only turn on briefly in their linear operation region and do not drive their outputs to the rails. The filter inductors are removed and the transistors deliver the necessary amount of current to the output capacitor to adjust its voltage the desired level for each discrete step of the audio signal. This is particularly effective when the load attached to the inverter is itself highly capacitive, as in an electrostatic loudspeaker or electrostatic pump/driver card stack. With minor adjustments to the gate circuitry and pulse timing, the desired effect can be achieved with BJTs, MOSFETS, or IGBTs. With the removal of the filter inductors, their losses are eliminated, as well as any turn off transient voltage spikes. Additionally, no freewheeling diodes are required in the circuit.

For each digital sample of the audio signal, the controller decides which transistors to operate and then applies a circuit model to predict the pulse length required for each discrete step on the output. The output voltage of each phase is sampled at a frequency equal to or above the sample rate of the audio signal and feedback adjustments are made to the pulse length algorithm for accurate tracking and low distortion.

In the loudspeaker application, one phase of the inverter is operated to directly track the audio signal, while the other is operated with the oppositely signed signal, creating a doubled voltage signal across the speaker terminals. For example, a sine wave can be generated on one phase of the inverter with an amplitude of +/−1000 V, or 2000 V peak to peak. The oppositely signed sine wave (which is 180 degrees phase shifted) is then generated on the other phase. The combined voltages at the speaker terminals have a peak difference of +/−2000 V, or 4000V peak to peak. Using embodiments of the present invention, this result has been achieved with multiple types of 1200V rated transistors.

An effective way to mitigate the undesired 180 degree sound signal (that results from the air that is drawn into the pump/driver cards at the same time that air is pushed out of the pump cards) is to block the 180 sound with the device itself (i.e., use the device as a baffle). This yields a device package that has a large face area relative to its thickness.

Another advantage is that both the metal and plastic parts used in the pump/driver cards can be fabricated by die stamping (and then trimming the plastic parts after the pump cards are assembled).

This also includes a manner in which hundreds of electrical connections to the pump cards can be handled in a compact and low cost fashion. This includes creating modular "card stacks" that can be used to create a number of different products with one standard building block.

Referring to FIG. 6, this figure shows a device 600 (loudspeaker) having two card stacks 601 with four cone drivers 602. Device 600 is thin relative to its face to reduce the unwanted 180 degree signal. Air is drawn in/out from the back of device 600 and comes out/in the front/side of the device without any obstructions (i.e., there is no central chamber). Since the device is battery powered (from one or more batteries 603), efficiency is key. It has been found that a prototype device is more than 100 times more efficient at 50 Hz than several top selling Bluetooth speakers.

FIG. 7A is an illustration of the front of the tested prototype. In this embodiment, the electronics and battery were positioned outside the housing. However, typically such electronics and battery is included within the housing. FIG. 7B is an illustration of the back side of the tested prototype. This shows that the prototype had around 65 pump/driver cards in the stack and a total of around 195 wire connections.

The card stack is designed such that it will automatically make the required electrical connections. In the card stack 800 shown in FIG. 8, as the pump card 801 is slipped on the four connection rods 802 (made of metal or some other electrically conducting materials), these connection rods 802 make the required electrical connections.

FIG. 9A is an exploded view of pump card 801 illustrating how those automatic connections work. There are little radial fingers 901 (shown in FIG. 9B) in the metal holes that make good electrical contact with the connection rods 802 when the pump cards 801 are slipped on the connection rods 802. The rods are connected to a circuit board (not shown) on the top or bottom of card stack 800 and this circuit board routes electrical connections to inverter terminals (not shown). It can also be seen the stator vents 902 and 907 on the extreme top and bottom along with the frame vents 904 and 905 between the two metal stators 903 and 906.

FIG. 10 is an illustration of a plastic/fiberglass stator vent assembly (along with a finished pump/driver card) that can be made inexpensively with a die stamping process. After the pump card is partially assembled, there are parts of the vents that are cut (such as with a saw or another stamp) to open up the airflow path (which can be seen by comparing vent assembly in the completed pump/driver card).

FIGS. 11-12 are illustrations showing how card stacks can be used in larger speaker products. The audio power due to airflow of these devices is proportional to the square of the number of cards stacks (the nine stack device 1200 of FIG. 12 will be about 20 times more powerful than a two stack device 600 due to increased airflow alone). Also, as the face of the speaker gets larger more of the undesired 180 signal is blocked so a nine stack device 1200 will be closer to 50 times more powerful than a two stack device 600. Small aluminum feet 1100 can be used to support the device during use but can be twisted into a more compact position for travel.

FIG. 13 illustrates a position sensor that can be integrated into a pump/driver card. The thin line of metal 1301 in middle of membrane 1304 is a low resistance (on the order of $10^3$ ohms per square) trace and it is connected to terminal 1303 ($T_2$). The two larger traces 1305 connected to terminal 1302 ($T_1$) are made of high resistance (on the order of $10^{10}$ ohms per square) material such as a few nanometers of vapor deposited metal or graphite. The stator 1306 has a low resistance middle trace 1309 connected to terminal 1308 ($T_4$) and another low resistance trace 1310 connected to terminal 1307 ($T_3$). Voltages applied to loudspeaker terminal 1302 ($T_1$) and terminal 1307 ($T_3$) are used to move the membrane with electric fields and charges as in the other embodiments.

To measure the position of the membrane, a high frequency (about $10^6$ Hz) signal can be applied across terminal 1303 ($T_2$) and terminal 1308 ($T_4$). As the distance between the traces 1301 and 1309 changes, the capacitance between these traces changes. This change in capacitance causes a shift in phase between the applied voltage and current of the high frequency signal. This phase shift can be used to determine the absolute position and velocity of the membrane 1304. Another way to determine membrane position is to apply a first high frequency (about $10^6$ Hz) voltage to T4 and a second high frequency voltage (that is 180 degrees out of phase with the first voltage signal) to the central terminal of the other stator (not shown). When the membrane is equidistant from each stator there will be no net voltage on terminal 1303 ($T_2$) but as the membrane moves toward one stator (and thus away from the other stator) there will be a net signal on terminal 1303 ($T_2$) that can be used to determine the position of the membrane. Many of these sensors (one for each pump card) can be put in parallel to increase the change in capacitance with membrane position and thus increase the signal to noise ratio of the position sensor system.

A controller (not shown) can be used to compare the ideal position/velocity needed to create a given sound with the measured values. The time-varying voltage applied to terminal 1302 ($T_1$) and terminal 1307 ($T_3$) can then be adjusted (within microseconds) so that the membrane position and velocity are forced to be maintained close to the ideal values. This technique is especially useful for an electrostatic card pump/driver that has substantial back pressure that varies with both sound volume level and audio frequency.

Alternatively, a DC voltage can be applied between terminal 1303 ($T_2$) and terminal 1308 ($T_4$) to determine the velocity (but not position) of membrane 1304 by measuring the time-varying current (that is caused by the time-varying capacitance between traces 1301 and 1308 as the membrane moves) through a resistor that is placed in series with the DC voltage.

Further to the Pinkerton '615 application and the Pinkerton '235 application, it has been discovered that the audio power per unit volume/mass of the device can be increased significantly (such as by a factor of 10 in some instances). Factors underlying this advance include:

Using a shared stator with vent support fingers instead of two stators per electroacoustic transducer (ET).

Eliminating the stator holes and associated stator vents (by making the electroacoustic transducer narrower and optimizing the vents located between the membrane and stator).

Increasing the permissible stator and membrane voltages by laminating the stator metal with Mylar/PET-adhesive on both sides using a thermal laminator.

Increasing the vent area by using thinner and fewer vent fingers.

Decreasing the thickness of the stator by using balanced electrostatic forces (membranes on each side pull on the stator with near equal force).

Decreasing the thickness of the metal frame that supports the electrically conductive membrane by using an optimized number of vent finger supports.

Pumping more air per cubic centimeter of electroacoustic transducer stack by replacing inactive stator vents with active transducers.

Increasing the baffle face area without increasing device volume by using narrow transducers and thus better blocking the unwanted 180 degree sound.

Increasing the total membrane area near the loudspeaker support (such as a table or floor, which act as an additional baffle to block the unwanted 180 degree sound).

Referring to the figures, FIGS. 15A-15C depict an electrically conductive membrane pump/transducer 1500 that utilizes an array of electrically conductive membrane pumps that cause a membrane 1501 to move in phase. FIG. 15A shows how airflow/sound can be directed out of a curved electroacoustic actuator at different angles. FIG. 15B depicts a cross section curved line 1502 (A-A') that reflects the cross-section that is the viewpoint of FIG. 15C. FIG. 15C shows a dual stator configuration (with solid stators 1503 and 1504) and also shows the vent area 1505 in the device of FIGS. 15A-15B.

FIG. 16A illustrates an electroacoustic transducer 1601 ("ET," which can also be referred to as a "pump card") and its solid stator 1602 (shown in more detail in FIG. 16B). Vent fingers 1603 are also shown in ET 1601. FIG. 16B is a magnified view of ET 1601 and shows how there are membranes 1604 and 1605 on each side of shared stator 1602.

FIG. 16C shows the electroacoustic transducer 1601 having a single stator card before trimming off the temporary support 1606 that supports the vent fingers 1603 (as shown in FIGS. 16A-16B). This process enables a low cost die stamping construction. Parts can be stamped out (which is very low cost), then epoxied together, and then the part 1606 that temporarily holds all the vent fingers 1603 in place can be quickly stamped off or trimmed off.

FIG. 17 is an exploded view of ET 1601. From top to bottom: FIG. 17 shows an electrically conductive membrane 1604, a first metal frame 1701, first non-conductive vent member 1702 (with its 23 vent fingers 1603), solid metal stator 1602, second non-conductive vent member 1704 (with its vent fingers 1706), and second metal frame 1705. (Second membrane 1605 is not shown). These parts can be joined together with epoxy, double-sided tape, sheet adhesive or any other suitable bonding process. After membrane 1604 is bonded to frame 1701 its entire outside edge (peripheral edge) is supported by frame 1701.

FIG. 18 is an exploded view of an electroacoustic transducer 1801 that has had its metallic frames and stator laminated on both sides with an insulating film. FIG. 19 is an illustration of a process to laminate the stator and frames of electroacoustic transducer 1801. FIG. 19 shows how the stator and frames can be laminated (on both sides 1901 and 1902) with an insulating film (such as a PET/Mylar-adhesive) using rollers 1903-1904 and 1905-1906. Experiments have shown that conventional insulating varnish is unable to prevent electrical breakdown/arcing within the very small air gaps located between the frames and stator. The lamination process of FIG. 19 has eliminated arcing and allowed the electroacoustic transducer to be used at higher voltages (which increases device audio power per cubic centimeter). Other insulating films, like Kapton® polyimide film, were used during a series of experiments, but these other films retained some electrical charge that caused the ET to pump less air and generate less audio power.

FIG. 20 shows an ET stack 2001. These stacks can serve as their own baffle and also pack a large amount of active membrane area near its supporting surface (such as a table or floor; which acts as an additional baffle).

FIG. 21 illustrates a completed portable loudspeaker 2101 with part of its protective metal grill 2102 removed. An illustrated soda can 2103 is used for size reference for loudspeaker 2101. The ET stacks of loudspeaker 2101 pump a large amount of air through the metal grill holes. If the grill gets warm, it can be cooled with this airflow. Hot electronic components, such as solid state switches and magnetics (inductors, transformers, etc.) can be in thermal contact with the grill. Heat can be conducted to the grill and then dissipated by the ET stack air flowing through the grill. This is a low cost and effective way to cool the internal components of the loudspeaker without adding a dedicated fan (which adds cost and unwanted noise).

FIG. 22 illustrates how static charge 2202 from the membrane 2201 of the electronic transducer using an alpha particle emitter 2203. The gap between the membrane 2201 and stator 2204 is so small that static charge 2202 can pull the membrane 2201 down into the stator 2204 without any applied voltages. Placing the alpha particle emitter 2203 near the membrane 2201 for a few minutes dissipates the static charge 2202 and allows the membrane 2201 to pop off (and stay off) the stator 2204.

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. For example, electrostatic speakers 3101 shown in FIG. 4 could replace electrodynamic cone speakers 602 in FIG. 6 to handle audio frequencies above approximately 150 Hz. Accordingly, other embodiments are within the scope of the following claims. The scope of protection is not limited by the description set out above, but is only limited by the claims which follow, that scope including all equivalents of the subject matter of the claims.

The disclosures of all patents, patent applications, and publications cited herein are hereby incorporated herein by reference in their entirety, to the extent that they provide exemplary, procedural, or other details supplementary to those set forth herein.

What is claimed is:

1. An electroacoustic transducer comprising:
    (a) an electrically conductive stator having a first side and a second side;
    (b) a first vent member on the first side of the electrically conductive stator, wherein the first vent member has a plurality of first vent fingers;
    (c) a second vent member on the second side of the electrically conductive stator, wherein the second vent member has a plurality of second vent fingers;
    (d) a first frame connected to the first vent member; and
    (e) an electrically conductive membrane connected to the first frame, wherein
        (i) the electrically conductive membrane is movable along a first axis,
        (ii) the plurality of first vent fingers are arranged so that air can flow between the plurality of first vent fingers along a second axis, and
        (iii) the first axis and the second axis are substantially perpendicular.

2. The electroacoustic transducer of claim 1 further comprising a second frame connected to the second vent member.

3. The electroacoustic transducer of claim 2, wherein the total thickness of the electroacoustic transducer is less than 2 mm.

4. The electroacoustic transducer of claim 2 wherein the total thickness of the electroacoustic transducer is less than 1 mm.

5. The electroacoustic transducer of claim 2, wherein the electroacoustic transducer has a total thickness and the electrically conductive membrane has a peak amplitude that exceeds 20% of the total thickness of the electroacoustic transducer.

6. The electroacoustic transducer of claim 2, wherein the electroacoustic transducer has a total thickness and the electrically conductive membrane has a peak amplitude that exceeds 40% of the total thickness of the electroacoustic transducer.

7. The electroacoustic transducer of claim 1, wherein the electrically conductive membrane is supported on all sides by the first frame.

8. The electroacoustic transducer of claim 1, wherein the first frame is electrically conductive.

9. The electroacoustic transducer of claim 8, wherein the first frame comprises metal.

10. The electroacoustic transducer of claim 9, wherein the metal comprises stainless steel.

11. The electroacoustic transducer of claim 1, wherein the first frame has a width that is at least five times its thickness.

12. The electroacoustic transducer of claim 1 further comprising an insulating film bonded to the first side of the electrically conductive stator and the second side of the electrically conductive stator.

13. The electroacoustic transducer of claim 12, wherein the insulating film is bonded to the electrically conductive stator using a thermal laminator.

14. The electroacoustic transducer of claim 1 further comprising an insulating film bonded to a first side of the first frame and a second side of the first frame.

15. The electroacoustic transducer of claim 14, wherein the insulating film is bonded to the first frame using a thermal laminator.

16. The electroacoustic transducer of claim 1, wherein the electrically conductive stator comprises metal.

17. The electroacoustic transducer of claim 16, the metal comprises stainless steel.

18. The electroacoustic transducer of claim 1, wherein the electrically conductive stator is between 1 cm and 5 cm wide.

19. The electroacoustic transducer of claim 1, wherein the electrically conductive stator has a thickness between 25 μm and 125 μm.

20. The electroacoustic transducer of claim 1, wherein the first frame has a thickness between 25 μm and 125 μm.

21. The electroacoustic transducer of claim 1, wherein the first vent member is an electrical insulator.

22. The electroacoustic transducer of claim 21, wherein the first vent member comprises fiberglass.

23. The electroacoustic transducer of claim 1, wherein the thickness of the first vent member is between 0.2 mm and 1 mm.

24. The electroacoustic transducer of claim 1, wherein the plurality of first vent fingers is between 5 and 50 first vent fingers and the plurality of the second vent fingers is between 5 and 50 second vent fingers.

25. The electroacoustic transducer of claim 1, wherein the first vent member is translucent.

26. The electroacoustic transducer of claim 1, wherein the first vent member is optically transparent.

27. The electroacoustic transducer of claim 1, wherein the electrically conductive membrane is subjected to an antistatic process using an alpha particle emitter.

28. A loudspeaker comprising a parallel stack of a plurality of electroacoustic transducers, wherein at least some of the electroacoustic transducers in the plurality of electroacoustic transducers each comprises:
    (a) an electrically conductive stator having a first side and a second side;
    (b) a first vent member on the first side of the electrically conductive stator, wherein the first vent member has a plurality of first vent fingers;
    (c) a second vent member on the second side of the electrically conductive stator, wherein the second vent member has a plurality of second vent fingers;
    (d) a first frame connected to the first vent member; and
    (e) an electrically conductive membrane connected to the first frame, wherein
        (i) the electrically conductive membrane is movable along a first axis,
        (ii) the plurality of first vent fingers are arranged so that air can flow between the plurality of first vent fingers along a second axis, and
        (iii) the first axis and the second axis are substantially perpendicular.

29. The electroacoustic transducer of claim 28, wherein the stack of the plurality of electroacoustic transducers has between 50 and 500 electroacoustic transducers.

30. The loudspeaker of claim 28 further comprising a metal grill and a plurality of electronic components that are at least partially in thermal contact with the metal grill.

31. A loudspeaker comprising a stack of a plurality of electroacoustic transducers, wherein at least some of the electroacoustic transducers in the plurality of electroacoustic transducers each comprises:
   (a) an electrically conductive stator having a first side and a second side;
   (b) a first vent member on the first side of the electrically conductive stator, wherein the first vent member has a plurality of first vent fingers;
   (c) a second vent member on the second side of the electrically conductive stator, wherein the second vent member has a plurality of second vent fingers;
   (d) a first frame connected to the first vent member;
   (e) an electrically conductive membrane connected to the first frame; and
   (f) a metal grill and a plurality of electronic components that are at least partially in thermal contact with the metal grill, wherein the operation of the stack creates airflow through the metal grill that indirectly cools an electronic component.

32. The loudspeaker of claim 28, wherein the stack serves as its own baffle.

33. The loudspeaker of claim 28, wherein the electrically conductive membranes in the stack have a total area that is at least 10 times larger than the face area of the stack.

34. The loudspeaker of claim 28, wherein the stack is less than 30 centimeters tall.

35. An electroacoustic transducer comprising:
   (a) an electrically conductive solid stator having a first side and a second side;
   (b) a first vent member on the first side of the electrically conductive solid stator;
   (c) a second vent member on the second side of the electrically conductive solid stator;
   (d) a first frame connected to the first vent member; and
   (e) an electrically conductive membrane supported on the entire outside edge of the electrically conductive membrane by the first frame, wherein
     (i) the electrically conductive membrane is movable along a first axis,
     (ii) the first vent member is arranged so that air can flow along a second axis, and
     (iii) the first axis and the second axis are substantially perpendicular.

\* \* \* \* \*